(12) United States Patent
Rahman et al.

(10) Patent No.: US 10,868,603 B2
(45) Date of Patent: Dec. 15, 2020

(54) METHOD AND APPARATUS TO ENABLE CSI REPORTING BASED ON SPACE-FREQUENCY COMPRESSION

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/294,716

(22) Filed: Mar. 6, 2019

(65) Prior Publication Data

US 2019/0280750 A1   Sep. 12, 2019

Related U.S. Application Data

(60) Provisional application No. 62/640,869, filed on Mar. 9, 2018, provisional application No. 62/749,879, filed
(Continued)

(51) Int. Cl.
*H04B 7/02* (2018.01)
*H04B 7/06* (2006.01)
(Continued)

(52) U.S. Cl.
CPC ........ *H04B 7/0626* (2013.01); *H04B 7/0456* (2013.01); *H04B 7/0469* (2013.01); *H04L 5/00* (2013.01)

(58) Field of Classification Search
CPC .................... H04B 7/0626; H04B 7/0456
See application file for complete search history.

(56) References Cited

U.S. PATENT DOCUMENTS

| | | | |
|---|---|---|---|
| 2016/0226649 A1* | 8/2016 | Papasakellariou | .... H04L 5/0057 |
| 2017/0054542 A1 | 2/2017 | Vermani et al. | |

(Continued)

FOREIGN PATENT DOCUMENTS

| | | |
|---|---|---|
| WO | 2017116120 A1 | 7/2017 |
| WO | 2018045302 A1 | 3/2018 |

OTHER PUBLICATIONS

"3rd Generation Partnership Project; Technical Specification Group Services and System Aspects; Feasibility Study on New Services and Markets Technology Enablers; Stage 1 (Release 14)", Sep. 2016, 95 pages.
(Continued)

*Primary Examiner* — Dhaval V Patel

(57) ABSTRACT

A method of a user equipment (UE) for a channel state information (CSI) feedback in a wireless communication system is provided. The method comprises receiving, from a base station (BS), CSI feedback configuration information including a number ($N_{SB}$) of subbands (SB) and a number (R) of frequency domain (FD) units per SB, wherein $N_{SB}$ and R determine a total number ($N_3$) of FD units; deriving CSI feedback based on the CSI feedback configuration information, wherein the CSI feedback includes a precoding matrix indicator (PMI) indicating a precoding matrix for each FD unit of the total number ($N_3$) of FD units; and transmitting the CSI feedback over an uplink channel.

24 Claims, 13 Drawing Sheets

Related U.S. Application Data on Oct. 24, 2018, provisional application No. 62/755,253, filed on Nov. 2, 2018, provisional application No. 62/772,310, filed on Nov. 28, 2018.

(51) Int. Cl.
*H04B 7/0456* (2017.01)
*H04L 5/00* (2006.01)

(56) References Cited

U.S. PATENT DOCUMENTS

2017/0302353 A1  10/2017  Rahman et al.
2017/0366316 A1  12/2017  Kim et al.

OTHER PUBLICATIONS

"3rd Generation Partnership Project; Technical Specification Group Radio Access Network; Evolved Universal Terrestrial Radio Access (E-UTRA); Multiplexing and channel coding (Release 15)", Dec. 2018, 247 pages.

"3rd Generation Partnership Project; Technical Specification Group Radio Access Network; Evolved Universal Terrestrial Radio Access (E-UTRA); Medium Access Control (MAC) protocol specification (Release 15)", Dec. 2018, 131 pages.

"3rd Generation Partnership Project; Technical Specification Group Radio Access Network; Evolved Universal Terrestrial Radio Access (E-UTRA); Physical channels and modulation (Release 15)", Dec. 2018, 240 pages.

"3rd Generation Partnership Project; Technical Specification Group Radio Access Network; Evolved Universal Terrestrial Radio Access (E-UTRA); Physical layer procedures (Release 15)", Dec. 2018, 550 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; Evolved Universal Terrestrial Radio Access (E-UTRA); Radio Resource Control (RRC); Protocol specification (Release 15)", Dec. 2018, 933 pages.

ISA/KR, International Search Report and Written Opinion of the International Searching Authority, International Application No. PCT/KR2019/002736, dated Jun. 26, 2019, 8 pages.

Vivo, "Discussion on CSI reporting," R1-1715618, 3GPP TSG RAN WG1 NR Ad Hoc #3, Nagoya, Japan, Sep. 18-21, 2017, 6 pages.

* cited by examiner

METHOD AND APPARATUS TO ENABLE CSI REPORTING BASED ON SPACE-FREQUENCY COMPRESSION

CROSS-REFERENCE TO RELATED APPLICATION(S) AND CLAIM OF PRIORITY

The present application claims priority to U.S. Provisional Patent Application Ser. No. 62/640,869, filed on Mar. 9, 2018, U.S. Provisional Patent Application Ser. No. 62/749,879, filed on Oct. 24, 2018, U.S. Provisional Patent Application Ser. No. 62/755,253, filed on Nov. 2, 2018, and U.S. Provisional Patent Application Ser. No. 62/772,310 filed on Nov. 28, 2018. The content of the above-identified patent documents is incorporated herein by reference.

TECHNICAL FIELD

The present disclosure relates generally to CSI acquisition, relates to enhanced high-resolution or Type II CSI reporting in which the channel or dominant eigenvectors of the DL channel is compressed in spatial (antenna ports) and frequency (SBs) domain jointly based on the idea of dimension reduction using basis vectors or matrices in an advanced wireless communication system.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

SUMMARY

Embodiments of the present disclosure provide methods and apparatuses to enable CSI reporting based on space-frequency compression in an advanced wireless communication system.

In one embodiment, a user equipment (UE) for a channel state information (CSI) feedback in a wireless communication system is provided. The UE comprises a transceiver configured to receive, from a base station (BS), CSI feedback configuration information including a number ($N_{SB}$) of subbands (SB) and a number (R) of frequency domain (FD) units per SB, wherein $N_{SB}$ and R determine a total number ($N_3$) of FD units. The UE further comprises a processor operably connected to the transceiver, the processor configured to derive CSI feedback based on the CSI feedback configuration information, wherein the CSI feedback includes a precoding matrix indicator (PMI) indicating a precoding matrix for each FD unit of the total number ($N_3$) of FD units, wherein the transceiver is further configured to transmit the CSI feedback over an uplink channel.

In another embodiment, a base station (BS) for a channel state information (CSI) feedback in a wireless communication system is provided. The BS comprises a transceiver configured to transmit, to a user equipment (UE), CSI feedback configuration information including a number ($N_{SB}$) of subbands (SB) and a number (R) of frequency domain (FD) units per SB, wherein $N_{SB}$ and R determine a total number ($N_3$) of FD units and receive, from the UE, the CSI feedback over an uplink channel. The BS further comprises a processor operably connected to the transceiver, the processor configured to determine the CSI feedback that is derived based on the CSI feedback configuration information transmitted to the UE, the CSI feedback including a precoding matrix indicator (PMI) indicating a precoding matrix for each FD unit of the total number ($N_3$) of FD units.

In yet another embodiment, a method of a user equipment (UE) for a channel state information (CSI) feedback in a wireless communication system is provided. The method comprises receiving, from a base station (BS), CSI feedback configuration information including a number ($N_{SB}$) of subbands (SB) and a number (R) of frequency domain (FD) units per SB, wherein $N_{SB}$ and R determine a total number ($N_3$) of FD units; deriving CSI feedback based on the CSI feedback configuration information, wherein the CSI feedback includes a precoding matrix indicator (PMI) indicating a precoding matrix for each FD unit of the total number ($N_3$) of FD units; and transmitting the CSI feedback over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
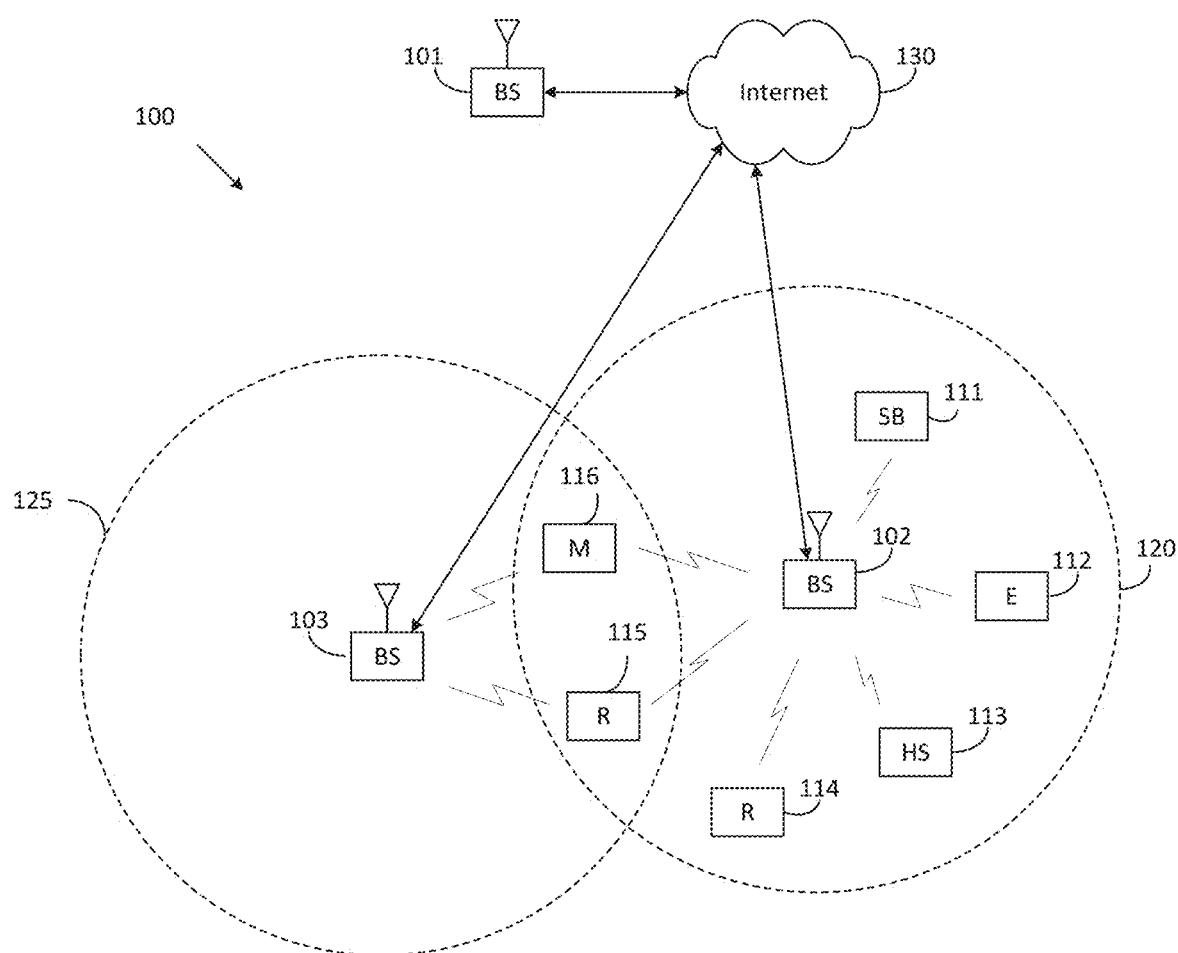
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v15.4.00, "E-UTRA, Physical channels and modulation;" 3GPP TS 36.212 v15.4.0, "E-UTRA, Multiplexing and Channel coding;" 3GPP TS 36.213 v15.4.0, "E-UTRA, Physical Layer Procedures;" 3GPP TS 36.321 v15.4.0, "E-UTRA, Medium Access Control (MAC) protocol specification;" 3GPP TS 36.331 v15.4.0, "E-UTRA, Radio Resource Control (RRC) protocol specification;" 3GPP TR 22.891 v14.2.0; 3GPP TS 38.212 v15.4.0, "E-UTRA, NR, Multiplexing and Channel coding;" and 3GPP TS 38.214 v15.4.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
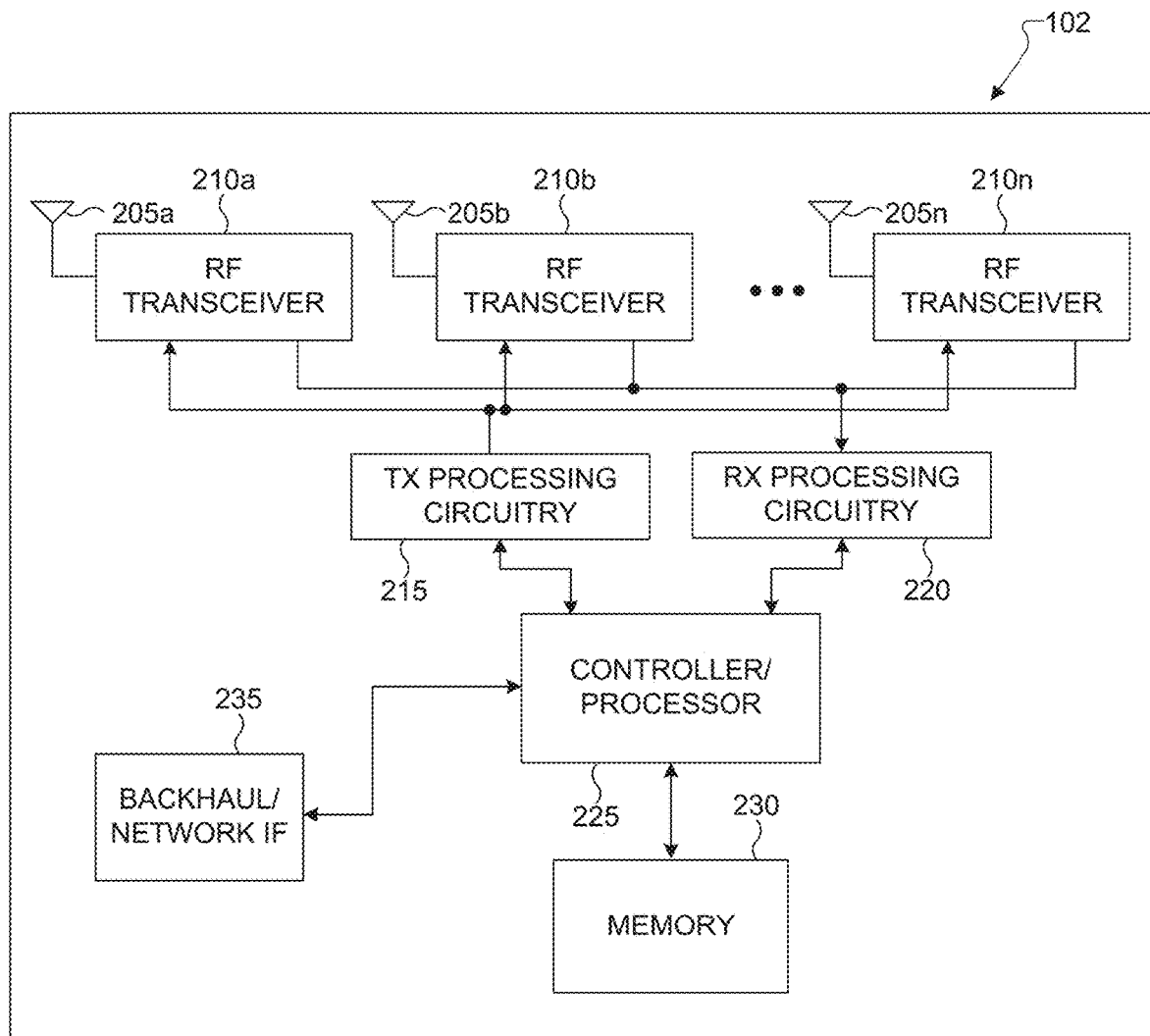
FIG. 2 illustrates an example eNB according to embodiments of the present disclosure.
Figure 3:
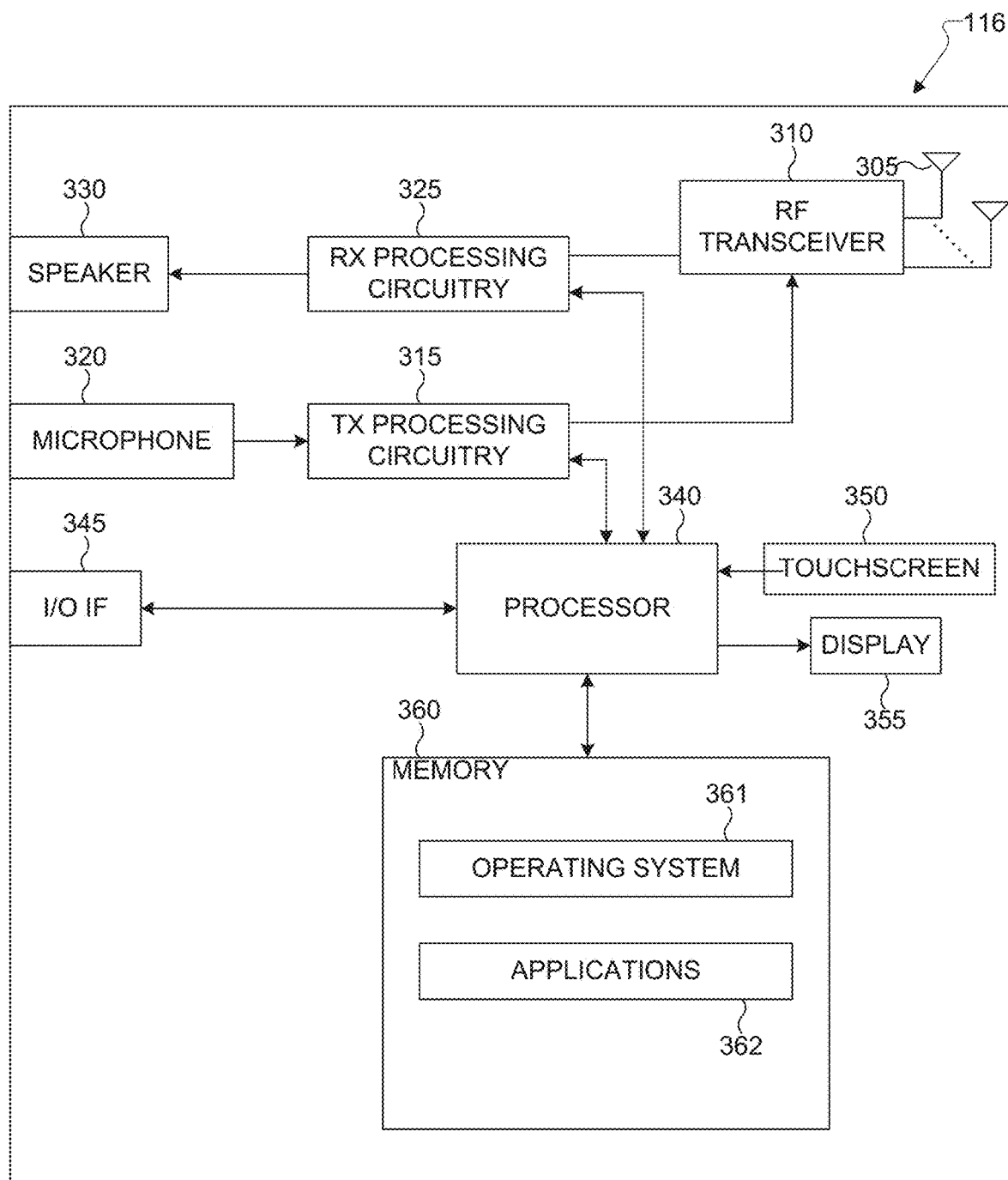
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting based on space-frequency compression in an advanced wireless communication system. In certain embodiments, and one or more of the eNBs 101-103 includes circuitry, programming, or a combination thereof, for CSI acquisition based on space-frequency compression in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
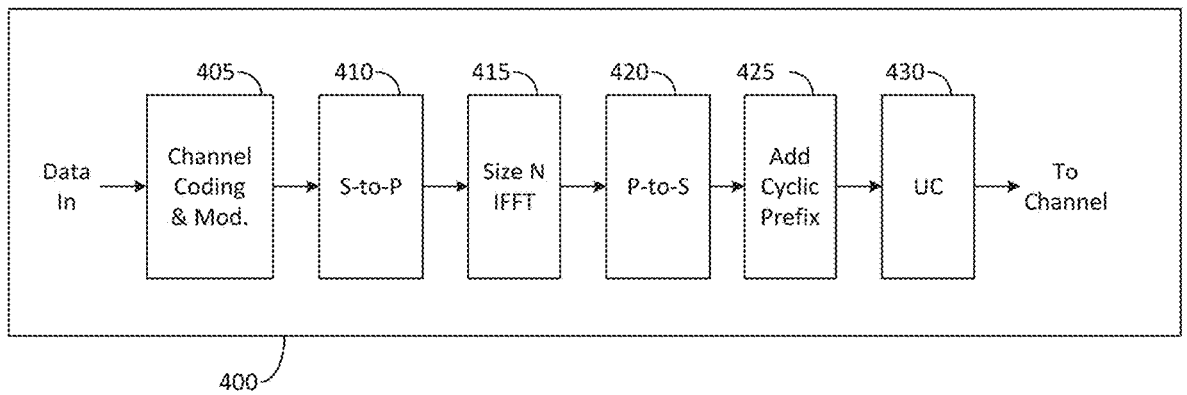
FIG. 4A illustrates a high-level diagram of an orthogonal frequency division multiple access transmit path according to embodiments of the present disclosure.
Figure 4B:
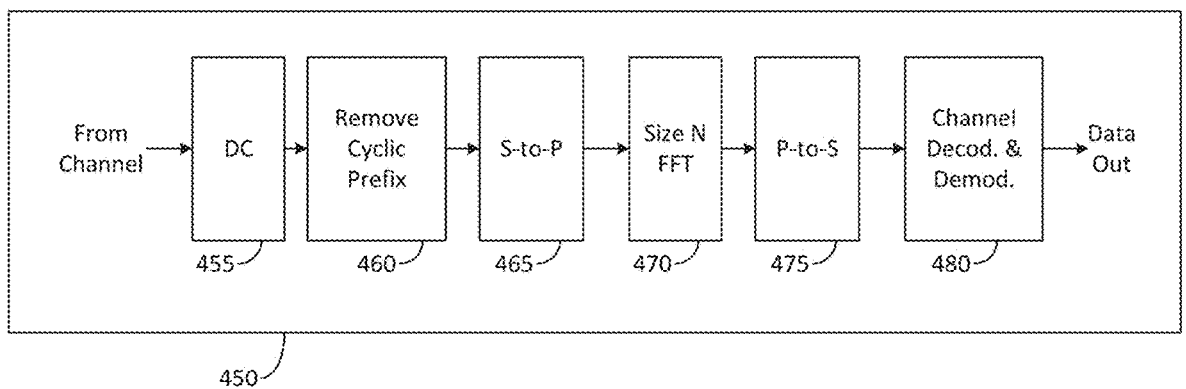
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

Figure 5:
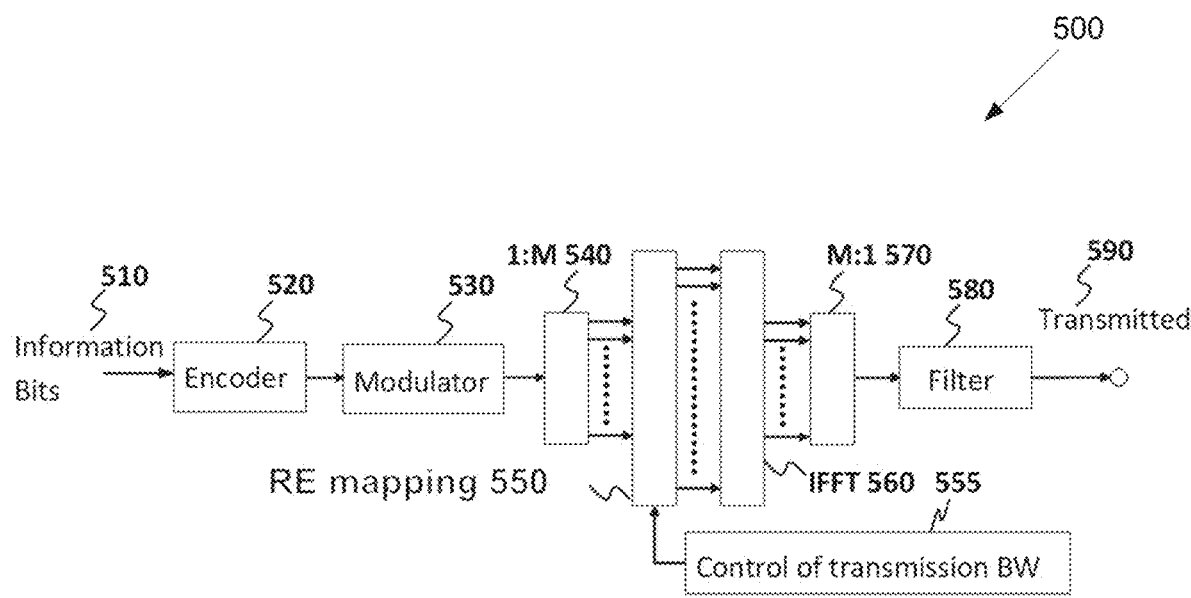
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
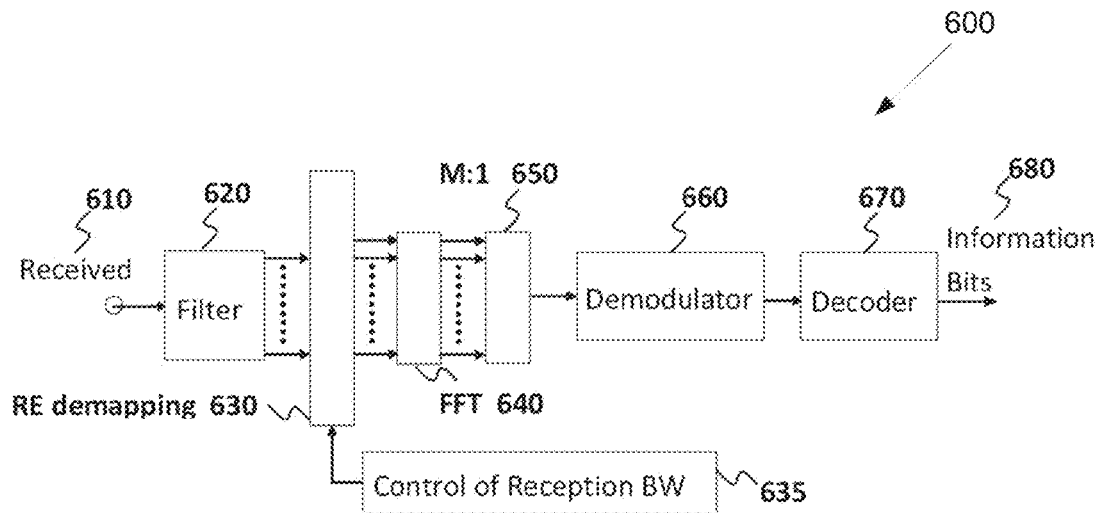
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
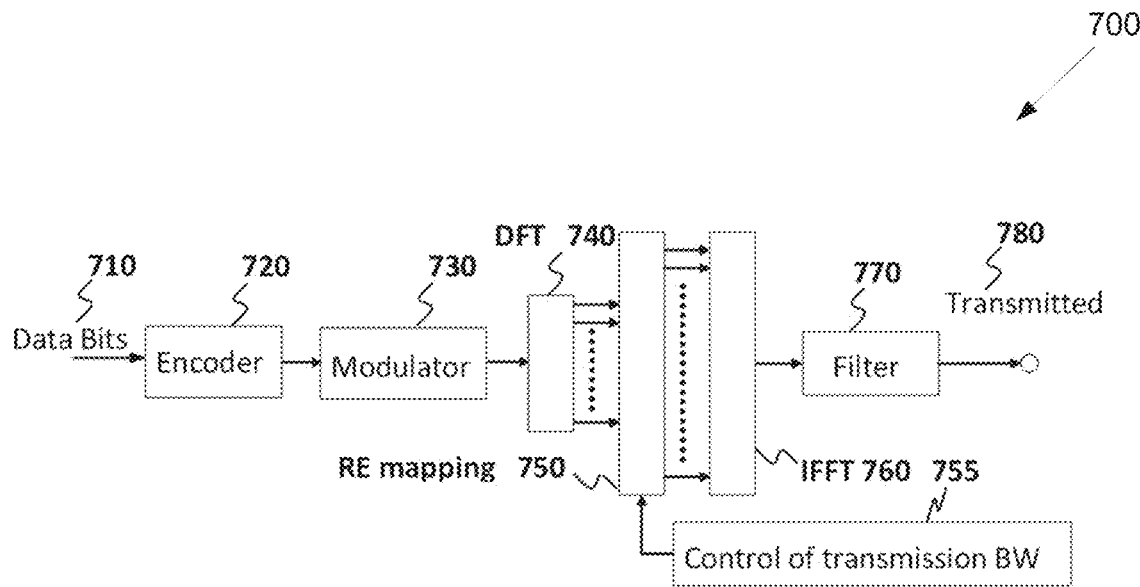
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
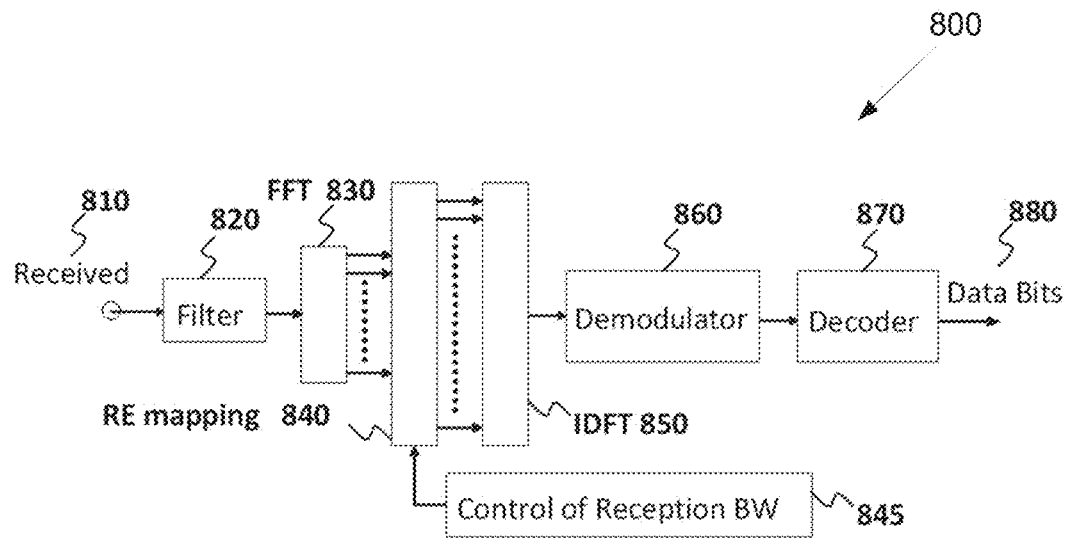
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
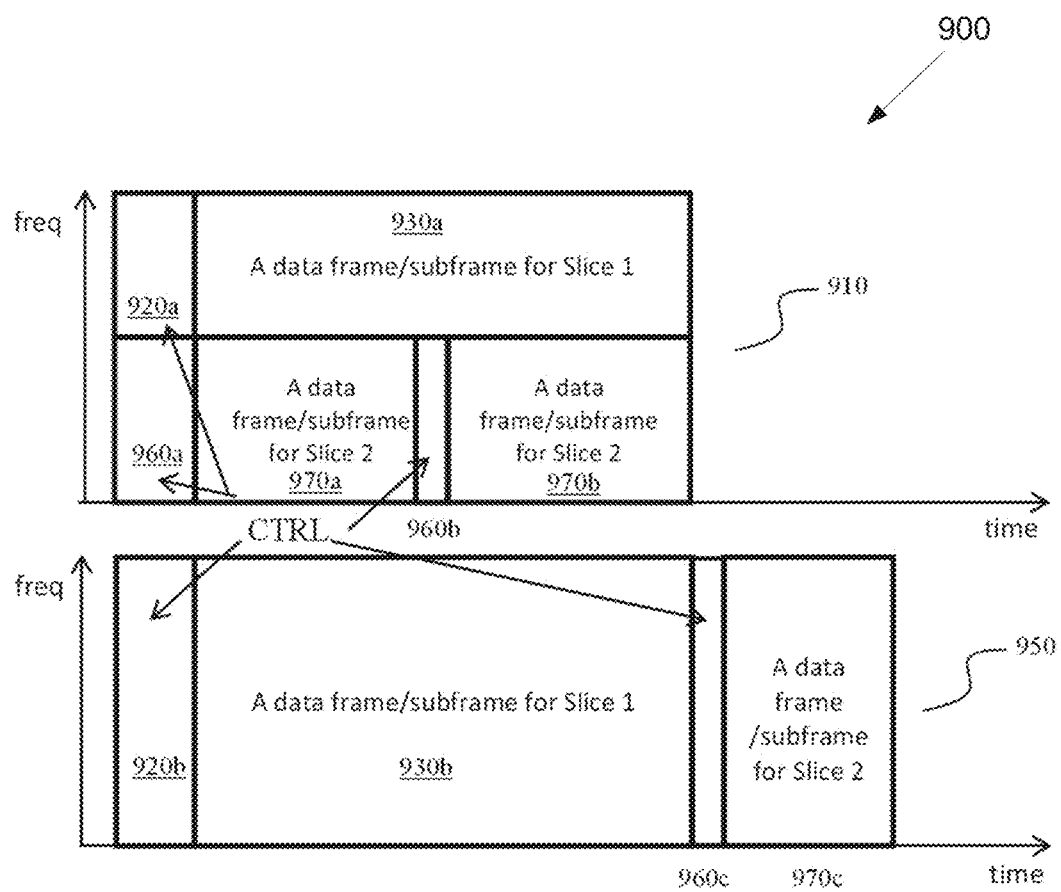
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
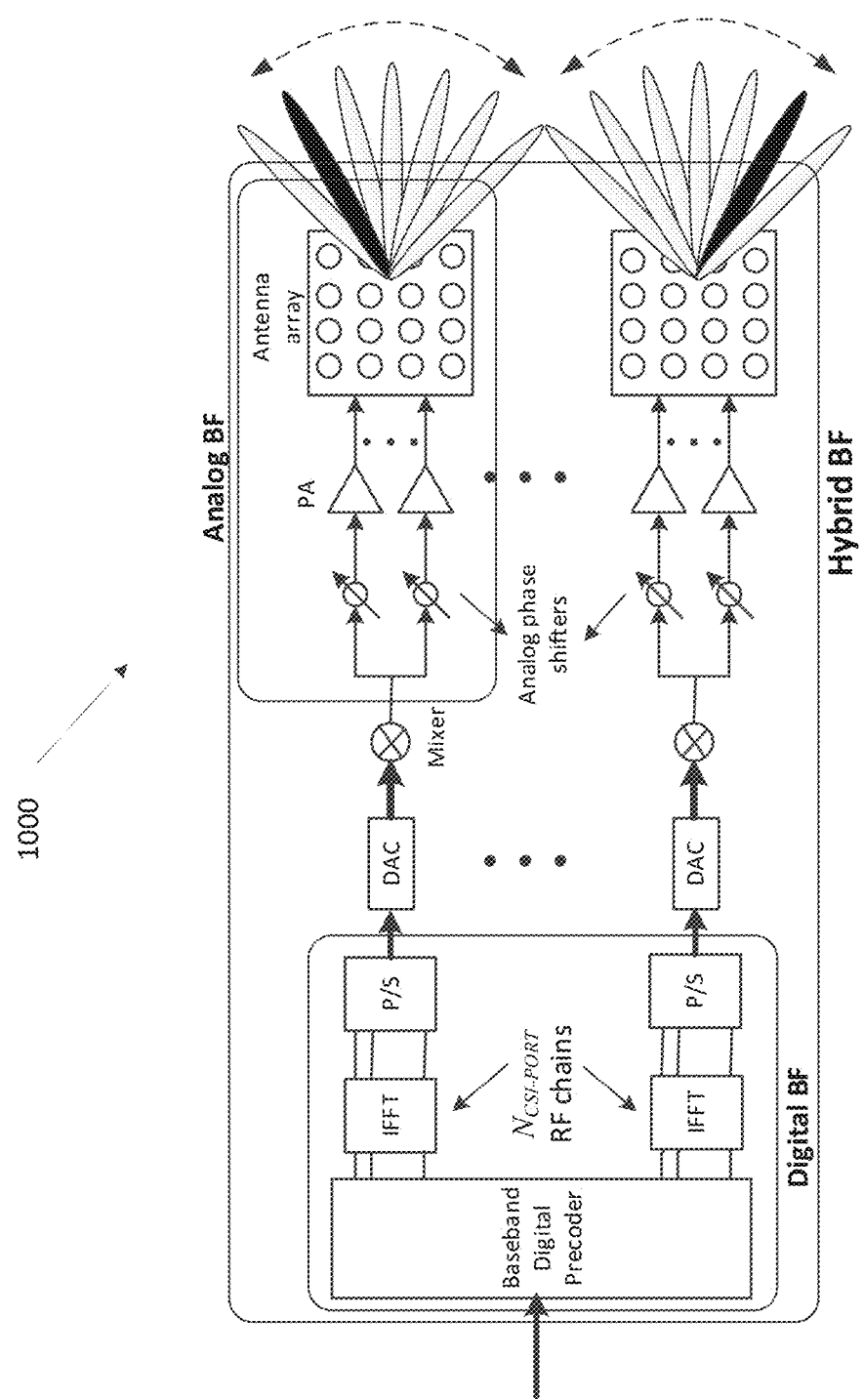
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Figure 11:
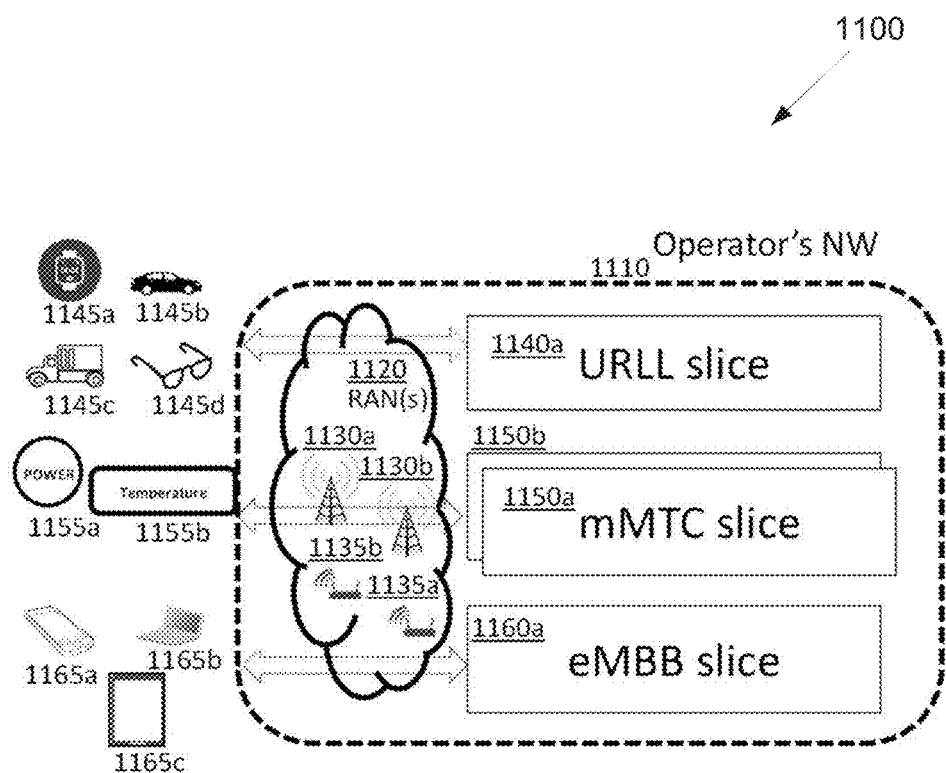
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as eNBs 1130a and 1130b, small cell base stations (femto/pico eNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the eNB perspective. at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In eFD-MIMO systems, MIMO has been identified as an essential feature in order to achieve high system throughput requirements and it may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE.

In legacy FDD systems, the CSI feedback framework is "implicit" in the form of CQI/PMI/RI (and CRI in LTE system) derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, the total number of Class A codebooks=44 i LTE specification), and the designed codebook is not guaranteed to bring justifiable performance benefits in practical deployment scenarios (for example, only a small percentage gain can be shown at the most). Realizing aforementioned issues, RAN1 agreed to provide specification support to advanced CSI reporting.

Compared to FD-MIMO and eFD-MIMO in LTE specification, in 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

The present disclosure covers several components which can be used in conjunction or in combination with one another, or can operate as standalone schemes.

Figure 12:
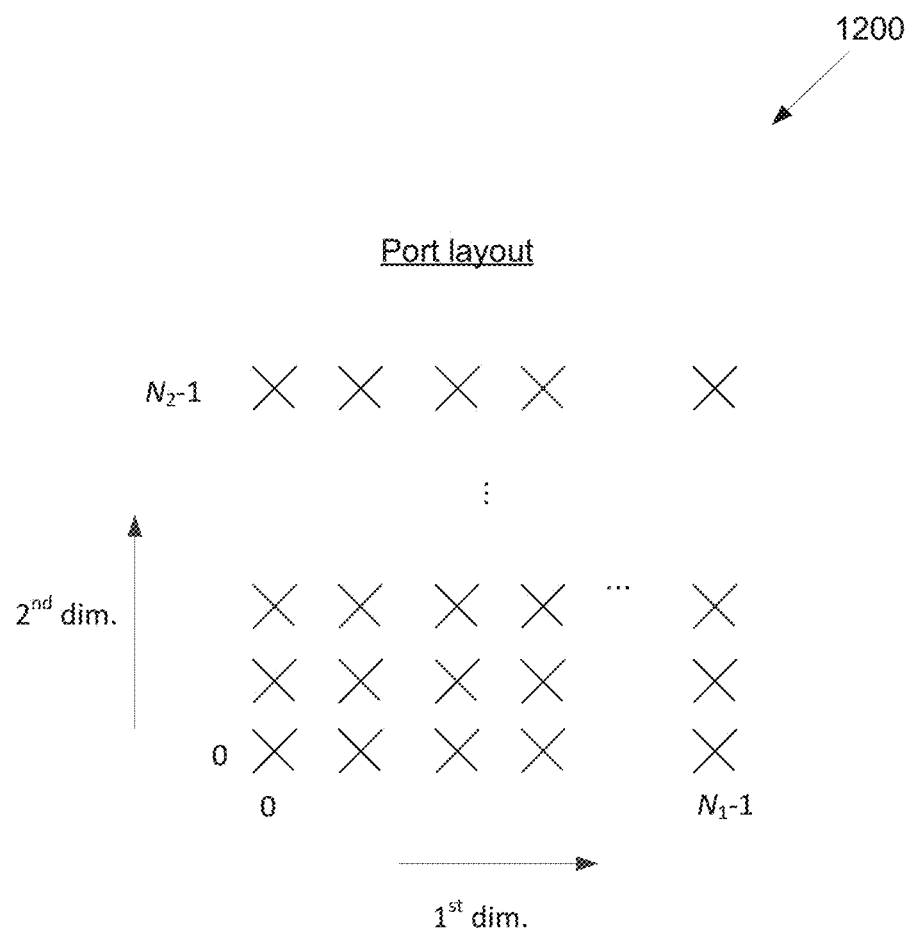
FIG. 12 illustrates an example antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation.

In the following, it is assumed that $N_1$ and $N_2$ are the number of antenna ports with the same polarization in the first and second dimensions, respectively. For 2D antenna port layouts, it is defined that $N_1>1$, $N_2>1$, and for 1D antenna port layouts $N_1>1$ and $N_2=1$. So, for a dual-polarized antenna port layout, the total number of antenna ports is $2N_1N_2$. An illustration is FIG. 12.

Figure 13:
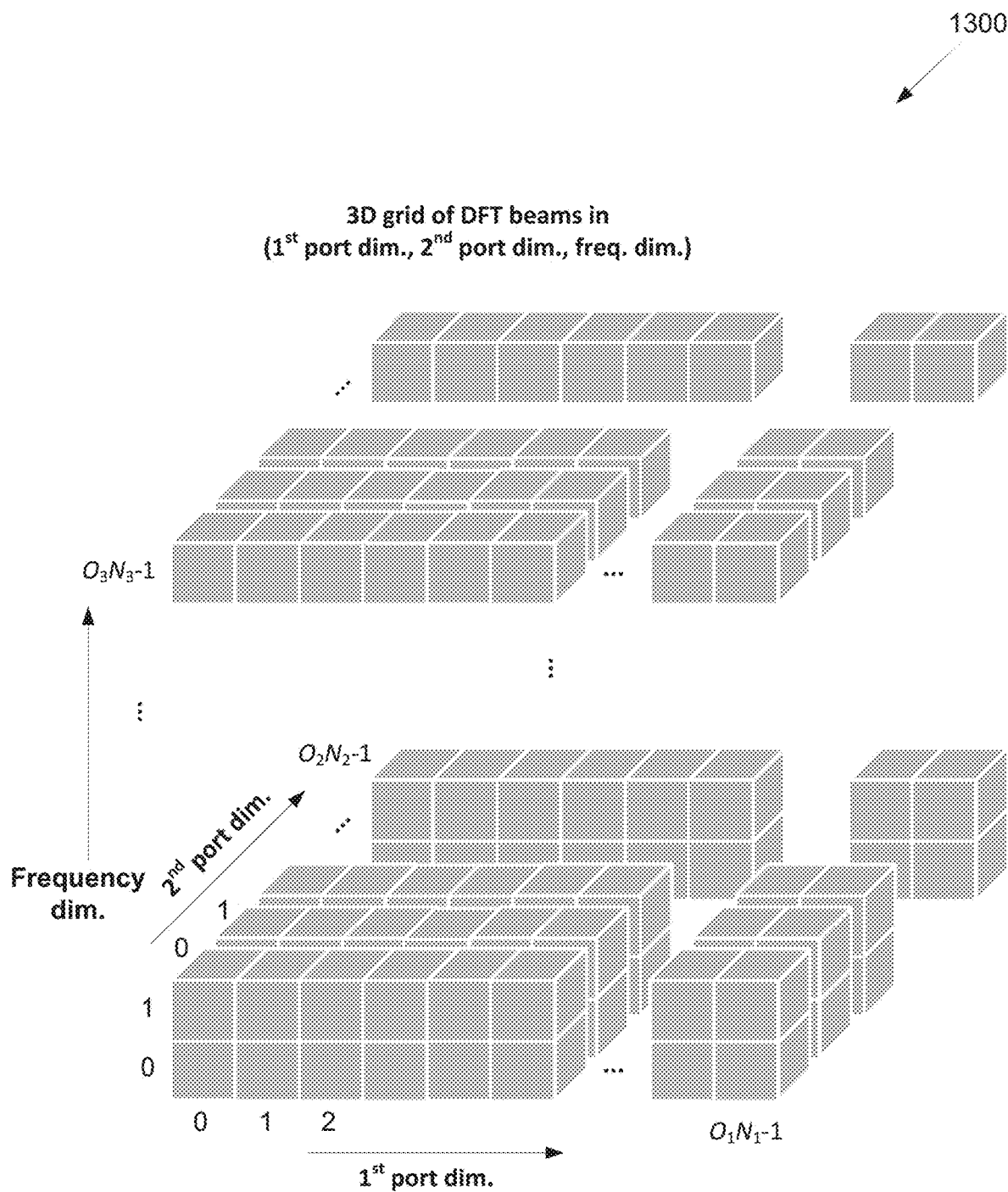
FIG. 13 illustrates an example 3D grid of DFT beams according to embodiments of the present disclosure.

FIG. 13 illustrates an example 3D grid of DFT beams 1300 according to embodiments of the present disclosure. The embodiment of the 3D grid of DFT beams 1300 illustrated in FIG. 13 is for illustration only. FIG. 13 does not limit the scope of this disclosure to any particular implementation.

A UE is configured with high-resolution (e.g. Type II) CSI reporting in which the linear combination based Type II CSI reporting framework is extended to include frequency dimension in addition to the 1st and 2nd antenna port dimensions. An illustration of the 3D grid of the oversampled DFT beams (1st port dim., 2nd port dim., freq. dim.) is shown in FIG. 13. In FIG. 13, the 1st dimension is associated with the 1st port dimension, the 2nd dimension is associated with the 2nd port dimension, and the 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_1$ belongs to $\{2, 4, 8\}$. In yet another example, at least one of $O_1$, $O_2$, and $O_3$ is higher layer configured (via RRC signaling).

In one embodiment 1, a UE is configured with higher layer parameter CodebookType set to "TypeII-Compression" or "TypeIII" for an enhanced Type II CSI reporting In which the pre-coders for all SBs and for a given layer l=1, . . . , v, where v is the associated RI value, is given by:

$$W^l = AC_l B^H = [a_0 \ a_1 \ \ldots \ a_{L-1}] \begin{bmatrix} c_{l,0,0} & c_{l,0,1} & \cdots & c_{l,0,K-1} \\ c_{l,1,0} & c_{l,1,1} & \cdots & c_{l,1,K-1} \\ \vdots & \vdots & \vdots & \vdots \\ c_{l,L-1,0} & c_{l,L-1,1} & \cdots & c_{l,L-1,K-1} \end{bmatrix}$$

$$[b_0 \ b_1 \ \ldots \ b_{K-1}]^H = \sum_{k=0}^{K-1} \sum_{i=0}^{L-1} c_{l,i,k}(a_1 b_k^H),$$

where: $N_1$ is a number of antenna ports in a first antenna port dimension; $N_2$ is a number of antenna ports in a second antenna port dimension; $N_3$ is a number of SBs or number of frequency domain (FD) units for PMI reporting (that comprise the CSI reporting band); $a_i$ is a $N_1N_2 \times 1$ column vector if antenna ports at the gNB are co-polarized, and is a $2N_1N_2 \times 1$ column vector if antenna ports at the gNB are dual-polarized or cross-polarized; $b_k$ is a $N_3 \times 1$ column vector; and $c_{l,i,k}$ is a complex coefficient. In the rest of the disclosure, the terms "SB for PMI reporting" and "FD unit for PMI reporting" are used inter-changeably since they are equivalent. In one example, the L column vectors of $A=[a_0 \ a_1 \ \ldots \ a_{L-1}]$ are used common for all of v layers, hence only one A is reported by the UE. In another example, the L column vectors of $A=[a_0 \ a_1 \ \ldots \ a_{L-1}]$ are used independently for each layer of the total v layers, hence one $A_l=[a_{l,0} \ a_{l,1} \ \ldots \ a_{l,L-1}]$ is reported by the UE for each layer l=1, . . . , v. Analogously, in one example, the K column vectors of $B=[b_0 \ b_1 \ \ldots \ b_{K-1}]$ are used common for all of v layers, hence only one B is reported by the UE. In another example, the L column vectors of $B=[b_0 \ b_1 \ \ldots \ b_{K-1}]$ are used independently for each layer of the total v layers, hence one $B_l=[b_{l,0} \ b_{l,1} \ \ldots \ b_{l,K-1}]$ is reported by the UE for each layer l=1, . . . , v. For simplicity, in the rest of the disclosure, it is assumed that A and B are reported common across layers. The embodiments of this disclosure, however, are general, and hence are applicable to the case when either A or B is reported independently across layers.

The values of $N_1$, $N_2$, and $N_3$ are configured with the higher-layer parameters CodebookConfig-N1, CodebookConfig-N2, and CodebookConfig-N3, respectively. Alternatively, the values of $N_1$, and $N_2$ are configured with the higher-layer parameters CodebookConfig-N1 and CodebookConfig-N2, respectively, and the value of $N_3$ is configured by configuring the Carrier bandwidth part (in PRBs) and Subband size (in PRBs). Alternatively, the value of $N_3$ is fixed to number of PRBs in the configured carrier bandwidth part. Alternatively, the value of $N_3$ is fixed to a value from {a, a+1, b} where a=number of SBs in configured carrier bandwidth part and b=number of PRBs in the configured carrier bandwidth part.

If a UE is configured to report CSI including CQI and PMI, where PMI indicates precoders $W^l$ for all layers l∈{1, . . . v} and the frequency granularity of CQI and PMI reporting is per SB, i.e. one CQI and one PMI are reported for each SB, then the SB size (in PRBs) for CQI and PMI reporting is according to at least one of the following alternatives.

In one embodiment of Alt 1A, the SB size for CQI and PMI reporting is the same. For example, the SB size (in PRBs) is configured according to LTE specification.

In one embodiment of Alt 1B, the SB size for CQI and PMI reporting can be different. In particular, the SB size (in PRBs) for CQI is larger or equal to that for PMI. At least one of the following sub-alternatives is used.

In one embodiment of Alt 1B-0, the SB size for CQI is configured according to LTE specification. The SB size for PMI is fixed according to at least one of the following examples.

In one example of Ex 1B-0-0, the SB size for PMI is fixed to 1 or ½ of SB size for CQI or 1/r of SB size for CQI, where r is an integer. In an example, r=2. In another example, r=4.

In one example of Ex 1B-0-1, the SB size for PMI is fixed to a value A regardless of the configured BW or bandwidth part or SB size of CQI. In one example, A=1. In another example, A=2. In another example, A=4.

In one example of Ex 1B-0-2, the SB size for PMI is fixed to a value A1 if the configured BW (or BW part) is less or equal to a fixed value B, and a value A2<A1 if the configured BW (or BW part) is greater than the fixed value B. In one example, (A1, A2)=(x, 1). In another example, (A1, A2)=(x, 2). In another example, (A1, A2)=(x, 4). Here, x is SB size for CQI for the configured BW (or BW part). In one example, B=72 PRBs. In another example, B=144 PRBs.

In one example of Ex 1B-0-3, the SB size for PMI is fixed to a value A1 if the configured SB size for CQI (x) is less or equal to a fixed value B, and a value A2<A1 if the configured SB size for CQI (x) is greater than the fixed value B. In one example, (A1, A2)=(x, 1). In another example, (A1, A2)=(x, 2). In another example, (A1, A2)=(x, 4). In one example, B=4. In another example, B=8.

In one example of Alt 1B-1, the SB size for both CQI and PMI can be configured. For example, the SB size for CQI is according to LTE specification. The SB size for PMI can be configured according to at least one of the following examples.

In one example of Ex 1B-1-0, the SB size for PMI ($N_{3,size}$) is configured from {1, 2, . . . , SB size for CQI, $N_{SB,size}$} or from {1/R of SB size for CQI, where R=is an integer which is configured}. In one example, the SB size for PMI is configured from {2, 4} or {1, 2} or {1, 4}. In another example, the SB size for PMI is configured from $$\left\{\frac{x}{2}, \frac{x}{4}\right\} \text{ or } \left\{x, \frac{x}{4}\right\} \text{ or } \left\{x, \frac{x}{2}\right\} \text{ or } \{1, x\},$$

where x is SB size for CQI. In one example, $$N_{3,size} = \frac{1}{R} \times N_{SB,size},$$

where R is configured from {1,2}.

In one example of Ex 1B-1-1, the SB size for PMI is fixed if the configured BW (or BW part) is less or equal to a fixed value B, and the SB size for PMI is configured if the configured BW (or BW part) is greater than the fixed value B. If the SB size of PMI is fixed, then it is according to at least one examples in Ex 1B-0-2. If the SB size of PMI is configured, then it is according to at least one examples in Ex 1B-1-0. In one example, B=72 PRBs. In another example, B=144 PRBs.

In one example of ex 1B-1-2, the SB size for PMI is fixed if the configured SB size for CQI (x) is less or equal to a fixed value B, and the SB size for PMI is configured if the configured SB size for CQI (x) is greater than the fixed value B. If the SB size of PMI is fixed, then it is according to at least one examples in Ex 1B-0-3. If the SB size of PMI is configured, then it is according to at least one examples in Ex 1B-1-0. In one example, B=4. In another example, B=8.

In one example of Alt 1C, the SB size for CQI and PMI reporting can be different. In particular, the SB size (in PRBs) for PMI is larger than that for CQI. At least one of the following sub-alternatives is used.

In one example of Alt 1C-0, the SB size for PMI is configured according to LTE specification. The SB size for CQI is fixed, for example, to 1 or ½ of SB size for PMI or 1/r of SB size for PMI, where r is an integer.

In one example of Alt 1C-1, the SB size for both CQI and PMI are configured. For example, the SB size for PMI is according to LTE specification. The SB size for CQI is configured from {1, 2, . . . , SB size for PMI} or from {1/r of SB size for PMI, where r=is an integer}.

In one example of Alt 1D, the SB size for CQI and PMI reporting is the same if SB size for CQI is less or equal to a fixed value y (i.e., x≤y) and the SB size of PMI reporting is less than that for CQI reporting if SB size for CQI is larger than a fixed value y (i.e., x>y). In example, the fixed value y=4 or 8. If the SB size of PMI is less than that for CQI, then the SB size for PMI is determined according to at least one example in Alt 1B.

In one example of Alt 1E, the SB size for CQI and PMI reporting is the same if SB size for CQI is less than a fixed value y (i.e., x<y) and the SB size of PMI reporting is less than that for CQI reporting if SB size for CQI is larger or equal to a fixed value y (i.e., x≤y). In one example, the fixed value y=4 or 8. If the SB size of PMI is less than that for CQI, then the SB size for PMI is determined according to at least one example in Alt 1B.

In one example, the term "SB for PMI reporting" is analogously referred to as "frequency domain (FD) unit for PMI reporting" where a FD unit corresponds to a number of consecutive physical resource blocks (PRBs). Note that in Ex 1B-1-0, R equals a number of FD units per SB for CQI reporting, and hence a number ($N_{SB}$) of SBs for CQI reporting and R together determine a total number ($N_3$) of FD units for PMI reporting. For example, $N_3=N_{SB} \times R$.

The value of L is configured with the higher layer parameter NumberOfBeams or NumberOfBeamsForPort, where L=2 when $P_{CSI-RS}=4$ and L∈{2, 3, 4} when $P_{CSI-RS}>4$. Alternatively, L=2 when $P_{CSI-RS}=4$ and L∈{2, 3, 4} when $P_{CSI-RS}=8$ and L∈{2, 3, 4, 6} when $P_{CSI-RS}>8$. Alternatively, L=2 when $P_{CSI-RS}=4$ and L∈{2, 4} when $P_{CSI-RS}>4$. Alternatively, L=2 when $P_{CSI-RS}=4$ and L∈{2, 4} when $P_{CSI-RS}=8$ and L∈{2, 4, 6} when $P_{CSI-RS}>8$. Alternatively, L=2 when $P_{CSI-RS}=4$ and L∈{2, 3, 4} when $P_{CSI-RS}=X$ and L∈{2, 3, 4, 6} when $P_{CSI-RS}>X$. Alternatively, L=2 when $P_{CSI-RS}=4$ and L∈{2,4} when $P_{CSI-RS}=X$ and L∈{2, 4, 6} when $P_{CSI-RS}>X$. The value X is fixed, for example to 12, 16, or 24.

The value of K is configured with the higher layer parameter NumberOfBeamsForSubband, where the configured K value is expected to be at most equal to the number of SBs, i.e., $K \leq N_3$.

Alternatively, the values of L and K are determined according to at least one of the following alternatives.

In one example of Alt 1-0, both L and K are configured via higher layer parameter signaling.

In one example of Alt 1-1, L is configured via higher layer parameter signaling and K is fixed (e.g. K=2, 3, or 4).

In one example of Alt 1-2, K is configured via higher layer parameter signaling and L is fixed.

In one example of Alt 1-3, both L and K are fixed (e.g. L or K=2, 3, or 4).

In one example of Alt 1-4, L is configured, and M is reported by the UE as part of the CSI report. If CSI is reported as a single UCI, M is reported as part of the WB PMI (i1 or i1,x where x is an integer). If CSI is reported as a two-part UCI, M is reported as part of either part 1 UCI or part 2 UCI (either WB part of part 2 UCI or SB part of part 2 UCI).

In one example, K is fixed to either $$\left\lfloor \frac{S}{2} \right\rfloor \text{ or } \left\lceil \frac{S}{2} \right\rceil,$$

where $N_{SB}=S$ is number of SBs configured for CQI reporting. In another example, K is configured from $$\left\{\left\lfloor \frac{S}{2} \right\rfloor, \left\lfloor \frac{S}{4} \right\rfloor\right\} \text{ or } \left\{\left\lceil \frac{S}{2} \right\rceil, \left\lceil \frac{S}{4} \right\rceil\right\} \text{ or } \left\{\left\lfloor \frac{S}{2} \right\rfloor, \left\lfloor \frac{S}{3} \right\rfloor\right\} \text{ or } \left\{\left\lceil \frac{S}{2} \right\rceil, \left\lceil \frac{S}{3} \right\rceil\right\}.$$

In another example, if SB size is configured from the two values specified in LTE specification, which is copied in TABLE 1 below, then K is fixed, e.g., to either $$\left\lfloor \frac{S}{2} \right\rfloor \text{ or } \left\lceil \frac{S}{2} \right\rceil,$$

if SB size is larger of the two values, and K is configured, e.g. from $$\left\{\left\lfloor \frac{S}{2} \right\rfloor, \left\lfloor \frac{S}{4} \right\rfloor\right\} \text{ or } \left\{\left\lceil \frac{S}{2} \right\rceil, \left\lceil \frac{S}{4} \right\rceil\right\} \text{ or }$$

$$\left\{\left\lfloor \frac{S}{2} \right\rfloor, \left\lfloor \frac{S}{3} \right\rfloor\right\} \text{ or } \left\{\left\lceil \frac{S}{2} \right\rceil, \left\lceil \frac{S}{3} \right\rceil\right\},$$

otherwise. In another example, a number (K) of column vectors for FD units is determined as $K=\lceil p \times N_3/R \rceil$, where p is configured from {½,¼}. In another example, a number (K) of column vectors for FD units is determined as $K=\lceil p \times N_{SB} \rceil=\lceil p \times S \rceil$, where p is configured from {½,¼}

In yet another example, if number of SBs is less than a fixed value T, (i.e., S<T), then K is fixed, e.g., to either $$\left\lfloor \frac{S}{2} \right\rfloor \text{ or } \left\lceil \frac{S}{2} \right\rceil,$$

and if number of SBs is larger or equal to a fixed value T, (i.e., S≥T), then K is configured, e.g. from $$\left\{\left\lfloor \frac{S}{2} \right\rfloor, \left\lfloor \frac{S}{4} \right\rfloor\right\} \text{ or } \left\{\left\lceil \frac{S}{2} \right\rceil, \left\lceil \frac{S}{4} \right\rceil\right\} \text{ or }$$

$$\left\{\left\lfloor \frac{S}{2} \right\rfloor, \left\lfloor \frac{S}{3} \right\rfloor\right\} \text{ or } \left\{\left\lceil \frac{S}{2} \right\rceil, \left\lceil \frac{S}{3} \right\rceil\right\}.$$

In yet another example, if number of SBs is less or equal to a fixed value T, (i.e., S≤T), then K is fixed, e.g., to either $$\left\lfloor \frac{S}{2} \right\rfloor \text{ or } \left\lfloor \frac{S}{2} \right\rfloor,$$

and if number of SBs is larger than a fixed value T, (i.e., S>T), then K is configured, e.g. from $$\left\{\left\lfloor \frac{S}{2} \right\rfloor, \left\lfloor \frac{S}{4} \right\rfloor\right\} \text{ or } \left\{\left\lceil \frac{S}{2} \right\rceil, \left\lceil \frac{S}{4} \right\rceil\right\} \text{ or }$$

$$\left\{\left\lfloor \frac{S}{2} \right\rfloor, \left\lfloor \frac{S}{3} \right\rfloor\right\} \text{ or } \left\{\left\lceil \frac{S}{2} \right\rceil, \left\lceil \frac{S}{3} \right\rceil\right\}.$$

In one example, the fixed value T=9. In one example, $N_3=S$.

TABLE 1

Configurable subband sizes

| Bandwidth part (PRBs) | Subband size (PRBs) | Number of SBs (S) |
|---|---|---|
| <24 | N/A | N/A |
| 24-72 | 4 | 6-18 |
|  | 8 | 3-9 |
| 73-144 | 8 | 10-18 |
|  | 16 | 5-9 |
| 145-275 | 16 | 10-18 |
|  | 32 | 5-9 |

In another example, K belongs to the set {1, 2, ..., S−1} where S=number of SBs for CQI reporting, or alternatively, number of SBs for PMI reporting. In another example, K belongs to the set {$2^i$: i=1, 2, ..., p} where p=minimum j in {1, 2, ...} such that $$\left\lfloor \frac{S}{2^j} \right\rfloor = 0$$

and S=number of SBs for CQI reporting, or alternatively, number of SBs for PMI reporting.

In one example, when number of layers >1, (v>1), then the value L (fixed or configured) is according to at least one of the following alternatives.

In one example of Alt 1X-0, the value L is common for all layers l=0, 1, ... v−1.

In one example of Alt 1X-1, a common L value is used for each layer pair (l, l+1), where l=0, 2, ... v−1.

In one example, when v=2, a common L value is used for both layers l=0, 1. In one example, when v=3, a common L value ($L_0$) is used for layer pair (l, l+1)=(0, 1), and another L value ($L_1$) is used for layer l=2. In one example, when v=4, a common L value ($L_0$) is used for layer pair (l,l+1)=(0, 1), and another L value ($L_1$) is used for layer pair (l,l+1)=(2, 3).

In one example of Alt 1X-2, an independent L value ($L_l$) is used for each layer l=0, 1, ... v−1. In an example, $L_i > L_j$ for all i<j. In another example, $L_i \geq L_j$ for all i<j. In one example, when number of layers >1, (v>1), then the value K (fixed or configured) is according to at least one of the following alternatives.

In one example of Alt 1Y-0, the value M is common for all layers l=0, 1, ... v−1.

In one example of Alt 1Y-1, a common M value is used for each layer pair (l, l+1), where l=0, 2, ... v−1. In one instance, when v=2, a common M value is used for both layers l=0, 1. In one instance, when v=3, a common M value ($M_0$) is used for layer pair (l,l+1)=(0, 1), and another M value ($M_1$) is used for layer l=2. In one instance, when v=4, a common M value ($M_0$) is used for layer pair (l,l+1)=(0, 1), and another M value ($M_1$) is used for layer pair (l,l+1)=(2, 3).

In one example of Alt 1Y-2, an independent M value ($M_l$) is used for each layer l=0, 1, ... v−1. In an example, $M_i > M_j$ for all i<j. In another example, $M_i \geq M_j$ for all i<j.

The columns of $W^l$ are normalized to norm one. Assuming vectors $a_i$ for i=0, 1, ..., L−1 are orthogonal and vectors $b_k$ for k=0, 1, ..., K−1 are orthogonal, the coefficients of column k are normalized as follows:

$$c_{l,i,k} = \frac{1}{\sqrt{N_1 N_2 N_3 \sum_{m=0}^{L-1} |c_{l,m,k}|^2}}$$

where $|c_{l,m,k}|$ is the amplitude or magnitude or absolute value of the coefficient $c_{l,m,k}$.

For rank 1 or 1 layer (v=1), the pre-coding matrix is given by $W^{(1)} = W^1$. For rank 2 or 2 layers (v=2), the pre-coding matrix is given by $$W^{(2)} = \frac{1}{\sqrt{2}}[W^1 \quad W^2].$$

For rank R or R layers (v=R), the pre-coding matrix is given by $$W^{(R)} = \frac{1}{\sqrt{R}}[W^1 \quad W^2 \quad ... \quad W^R].$$

In embodiment 1A, which is variation of the aforementioned embodiment 1, the basis vectors $B_i = [b_{i,0} \; b_{i,1} \; ... \; b_{i,K-1}]$ is selected independently for each basis vector $a_i$. The pre-coders for all SBs and for a given layer l=1, ..., v, where v is the associated RI value, is then given by $$W^l = AC_l B^H$$
$$= AC_l [B_0 \quad B_1 \quad ... \quad B_{K-1}]^H$$
$$= [a_0 \quad a_1 \quad ... \quad a_{L-1}]$$

$$\begin{bmatrix} c_{l,0,0} & \cdots & c_{l,0,K-1} & 0 & & & \cdots & & 0 \\ 0 & & & c_{l,1,0} & \cdots & c_{l,1,K-1} & \cdots & & 0 \\ \vdots & & & \vdots & & \vdots & & & \vdots \\ 0 & & & 0 & & & \cdots & c_{l,L-1,0} & \cdots & c_{l,L-1,K-1} \end{bmatrix}$$

$$[B_0 \quad B_1 \quad ... \quad B_{K-1}]^H$$

$$= \sum_{i=0}^{L-1} \sum_{k=0}^{K-1} c_{l,i,k}(a_i b_{i,k}^H).$$

Note that the coefficient matrix is now a block diagonal matrix where an i-th block corresponds to coefficients $[c_{l,i,0} ... c_{l,i,K-1}]$ corresponding to i-th basis vector $a_i$ and the i-th basis vectors B.

In one example, the number of basis vectors comprising the basis sets $B_i$ is the same (K). In another example, the number of basis vectors comprising the basis sets $B_i$ can be different across i values. Let $K_i$ be number of basis vector comprising the basis sets $B_i$. Then the set of values {$K_i$} is either fixed, configured, or reported by the UE. If the set of values are reported by the UE, then the maximum value that each $K_i$ can take can be configured (via RRC signaling) to the UE. In one example, $K_i=0$ is supported. In another example, $K_i>0$ for all i. In another example, $K_i>0$ for at least one basis vector $a_i$ and $K_i=0$ is supported for at most L−1 basis vectors $a_i$.

In one embodiment 2, a UE is configured with higher layer parameter CodebookType set to "TypeII-Compression" or "TypeIII" for an enhanced Type II CSI reporting in which the pre-coders for all SBs and for a given layer l=1, ..., v, where v is the associated RI value, is given by $$W^l = \begin{bmatrix} A & 0 \\ 0 & A \end{bmatrix} C_l B^H = \begin{bmatrix} a_0 & a_1 & \cdots & a_{L-1} & & & 0 \\ & & 0 & & a_0 & a_1 & \cdots & a_{L-1} \end{bmatrix}$$

$$\begin{bmatrix} c_{l,0,0} & c_{l,0,1} & \cdots & c_{l,0,K-1} \\ c_{l,1,0} & c_{l,1,1} & \cdots & c_{l,1,K-1} \\ \vdots & \vdots & \vdots & \vdots \\ c_{l,2L-1,0} & c_{l,2L-1,1} & \cdots & c_{l,2L-1,K-1} \end{bmatrix}$$

-continued $$[b_0 \quad b_1 \quad \ldots \quad b_{K-1}]^H = \begin{bmatrix} \sum_{k=0}^{K-1}\sum_{i=0}^{L-1} c_{l,i,k}(a_i b_k^H) \\ \sum_{k=0}^{K-1}\sum_{i=0}^{L-1} c_{l,i+L,k}(a_i b_k^H) \end{bmatrix},$$

where: $N_1$ is a number of antenna ports in a first dimension; $N_2$ is a number of antenna ports in a second dimension; $N_3$ is a number of SBs or number of frequency domain (FD) units for PMI reporting (that comprise the CSI reporting band); $a_i$ is a $N_1N_2 \times 1$ column vector; $b_k$ is a $N_3 \times 1$ column vector; and $c_{i,k}$ is a complex coefficient.

The values of $N_1$, $N_2$, $N_3$, L, and K are determined according to the aforementioned embodiment 1.

The columns of $W^l$ are normalized to norm one. Assuming vectors $a_i$ for $i=0, 1, \ldots, L-1$ are orthogonal and vectors $b_k$ for $k=0, 1, \ldots, K-1$ are orthogonal, the coefficients of column k are normalized as follows:

$$c_{l,i,k} = \frac{1}{\sqrt{N_1 N_2 N_3 \sum_{m=0}^{2L-1} |c_{l,m,k}|^2}}$$

where $|c_{l,m,k}|$ is the amplitude or magnitude or absolute value of the coefficient $c_{l,m,k}$.

For rank 1 or 1 layer (v=1), the pre-coding matrix is given by $W^{(1)}=W^1$. For rank 2 or 2 layers (v=2), the pre-coding matrix is given by $$W^2 = \frac{1}{\sqrt{2}}[W^1 \quad W^2].$$

For rank R or R layers (v=R), the pre-coding matrix is given by $$W^{(R)} = \frac{1}{\sqrt{R}}[W^1 \quad W^2 \quad \ldots \quad W^R].$$

In embodiment 2A, which is variation of the aforementioned embodiment 2, the basis vectors $B_i=[b_{i,0} \quad b_{i,1} \quad \ldots \quad b_{i,K-1}]$ is selected independently for each basis vector $a_i$. The pre-coders for all SBs and for a given layer $l=1, \ldots, v$, where v is the associated RI value, is then given by $$W^l = \begin{bmatrix} A & 0 \\ 0 & A \end{bmatrix} C_l B^H$$

$$= \begin{bmatrix} A & 0 \\ 0 & A \end{bmatrix} C_l [B_0 \quad B_1 \quad \ldots \quad B_{K-1}]^H$$

$$= \begin{bmatrix} a_0 \quad a_1 \quad \ldots \quad a_{L-1} & 0 \\ 0 & a_0 \quad a_1 \quad \ldots \quad a_{L-1} \end{bmatrix}$$

$$\begin{bmatrix} c_{l,0,0} & \ldots & c_{l,0,K-1} & 0 & \ldots & 0 \\ 0 & & & c_{l,1,0} & \ldots & c_{l,1,K-1} & \ldots & 0 \\ \vdots & & \vdots & & \vdots & & \vdots \\ 0 & & & 0 & & \ldots & c_{l,L-1,0} & \ldots & c_{l,L-1,K-1} \end{bmatrix}$$

$$[B_0 \quad B_1 \quad \ldots \quad B_{K-1}]^H$$

$$= \begin{bmatrix} \sum_{i=0}^{L-1}\sum_{k=0}^{K-1} c_{l,i,k}(a_i b_k^H) \\ \sum_{i=0}^{L-1}\sum_{k=0}^{K-1} c_{l,i+L,k}(a_i b_k^H) \end{bmatrix}.$$

Note that the coefficient matrix is now a block diagonal matrix where an i-th block corresponds to coefficients $[c_{l,i,0} \ldots c_{l,i,K-1}]$ corresponding to i-th basis vector $a_i$ and the i-th basis vectors $B_i$.

In one example, the number of basis vectors comprising the basis sets $B_i$ is the same (K). In another example, the number of basis vectors comprising the basis sets $B_i$ can be different across i values. Let $K_i$ be number of basis vector comprising the basis sets $B_i$. Then the set of values $\{K_i\}$ is either fixed, configured, or reported by the UE. If the set of values are reported by the UE, then the maximum value that each $K_i$ can take can be configured (via RRC signaling) to the UE. In one example, $K_i=0$ is supported. In another example, $K_i>0$ for all i. In another example, $K_i>0$ for at least one basis vector $a_i$ and $K_i=0$ is supported for at most L−1 basis vectors $a_i$.

In embodiment 3, the UE is configured to report columns of $A=[a_0 \; a_1 \; \ldots \; a_{L-1}]$, and $B=[b_0 \; b_1 \; \ldots \; b_{K-1}]$ matrices in a WB manner, i.e., one A and one B are reported common for the entire CSI reporting band, according to at least one of the following alternatives.

In one example of Alt 3-0, the L column vectors of A are reported separately (which requires $L\lceil \log_2(N_1N_2) \rceil$ bits if A is reported common for all v layers or $L_l \log_2(N_1N_2)$ bits for layer $l=1, \ldots, v$ if A is reported independently for each layer $l=1, \ldots, v$), and the K column vectors of B are reported separately (which requires $K\lceil \log_2(N_3) \rceil$ bits if B is reported common for all v layers or $K_l \lceil \log_2(N_3) \rceil$ bits for layer $l=1, \ldots, v$ if B is reported independently for each layer $l=1, \ldots, v$). Here, $L_l$ and $K_l$ respectively are number of columns of $A=A_l$ and $B=B_l$ when $A_l$ and $B_l$ are reported independently.

In one example of Alt 3-1, the L column vectors of A are reported separately (which requires $L\lceil \log_2(N_1N_2) \rceil$ bits if A is reported common for all v layers or $L_l \log_2(N_1N_2)$ bits for layer $l=1, \ldots, v$ if A is reported independently for each layer $l=1, \ldots, v$), and the K column vectors of B are reported jointly (which requires $$\left\lceil \log_2 \binom{N_3}{K} \right\rceil$$

bits if B is reported common for all v layers or $$\left\lceil \log_2 \binom{N_3}{K_l} \right\rceil$$

bits for layer $l=1, \ldots, v$ if B is reported independently for each layer $l=1, \ldots, v$).

In one example of Alt 3-2, the L column vectors of A are reported jointly (which requires $$\left\lceil \log_2 \binom{N_1N_2}{L} \right\rceil$$

bits if A is reported common for all v layers or $$\left\lceil \log_2 \binom{N_1 N_2}{L_l} \right\rceil$$

bits for layer l=1, . . . , v if A is reported independently for each layer l=1, . . . , v), and the K column vectors of B are reported separately (which requires $K\lceil \log_2(N_3) \rceil$ bits if B is reported common for all v layers or $K_l \lceil \log_2(N_3) \rceil$ bits for layer l=1, . . . , v if B is reported independently for each layer l=1, . . . , v).

In one example of Alt 3-3, the L column vectors of A are reported jointly (which requires $$\left\lceil \log_2 \binom{N_1 N_2}{L} \right\rceil$$

bits if A is reported common for all v layers or $$\left\lceil \log_2 \binom{N_1 N_2}{L_l} \right\rceil$$

bits for layer l=1, . . . , v if A is reported independently for each layer l=1, . . . , v), and the K column vectors of B are reported jointly (which requires $$\left\lceil \log_2 \binom{N_3}{K} \right\rceil$$

bits if B is reported common for all v layers or $$\left\lceil \log_2 \binom{N_3}{K_l} \right\rceil$$

bits for layer l=1, . . . , v if B is reported independently for each layer l=1, . . . , v).

In one example, to report columns of A and B, the oversampled DFT codebooks are used. For instance, $a_i = v_{l,m}$ and $b_k = w_k$, where the quantities $v_{l,m}$ and $w_k$ are given by $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

$$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In one example, the supported configurations of $(N_1, N_2)$ for a given number of CSI-RS ports and the corresponding values of $(O_1, O_2)$ are given in TABLE 2. The number of CSI-RS ports, $P_{CSI-RS}$, is $2N_1 N_2$. The value of $N_3$ is configured by configuring the Carrier bandwidth part (PRBs) and Subband size (PRBs) according to LTE specification. The value of $O_3$ is fixed, for example to 1 or 2 or 4.

TABLE 2

Supported configurations of $(N_1, N_2)$ and $(O_1, O_2)$

| Number of CSI-RS antenna ports, $P_{CSI-RS}$ | $(N_1, N_2)$ | $(O_1, O_2)$ |
| --- | --- | --- |
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

In one embodiment 4, the UE is configured to report the amplitude and phase of coefficients $\{c_{l,i,k}\}$ separately as $c_{l,i,k} = p_{l,i,k}^{(1)} p_{l,i,k}^{(2)} \phi_{l,i,k}$ according to at least one of the following alternatives.

In one example of Alt 4-0, the phase coefficients $\{\phi_{l,i,k}\}$ are reported in a SB manner (i.e. for a given (l, i), a phase coefficient is reported for each k=0, 1, . . . , K−1), and the) amplitude coefficients $\{p_{l,i,k}^{(1)}\}$ are reported in a WB manner (i.e., for a given (l, i), an amplitude) coefficient is reported which is common for all k=0, 1, . . . , K−1. In this case, $p_{l,i,k}^{(2)} = 1$ is fixed, hence not reported.

In one example of Alt 4-1, the phase coefficients $\{\phi_{l,i,k}\}$ are reported in a SB manner (i.e. for a given (l, i), a phase coefficient is reported for each k=0, 1, . . . , K−1), and the) amplitude coefficients $\{p_{l,i,k}^{(2)}\}$ are reported in a SB manner (i.e. for a given (l, i), an amplitude coefficient is reported for each k=0, 1, . . . , K−1). In this case, $p_{l,i,k}^{(1)} = 1$ is fixed, hence not reported.

In one example of Alt 4-2, the phase coefficients $\{\phi_{l,i,k}\}$ are reported in a SB manner (i.e. for a given (l, i), a phase coefficient is reported for each k=0, 1, . . . , K−1), and the UE is configured with the higher layer parameter SubbandAmplitude set to "ON" or "OFF." When SubbandAmplitude is set to "OFF," amplitude coefficients $\{p_{l,i,k}^{(1)}\}$ are reported in a WB manner (i.e., for a given (l, i), an amplitude coefficient is reported which is common for all k=0, 1, . . . , K−1), and $\{p_{l,i,k}^{(2)}\}$ is not reported. When SubbandAmplitude is set to "ON," amplitude coefficients are reported in a differential or WB+SB manner (i.e., for a given (l, i), a WB amplitude component $p_{l,i,k}^{(1)}$ common for all k=0, 1, . . . , K−1 is reported, and in addition, a SB amplitude component $p_{l,i,k}^{(2)}$ for each k=0, 1, . . . , K−1 is also reported).

In one example of Alt 4-3, the phase coefficients $\{\phi_{l,i,k}\}$ and the second amplitude) coefficients $\{p_{l,i,k}^{(2)}\}$ are reported for each coefficient $c_{l,i,k}$. The first amplitude coefficient $\{p_{l,i,k}^{(1)}\}$ can be reported common for a group of coefficients $\{c_{l,i,k}\}$. In one example, there are two groups corresponding to two antenna polarizations (assuming dual-polarized antenna ports at the gNB), and one common first amplitude coefficient $\{p_{l,i,k}^{(1)}\}$ is reported for all coefficients with the same antenna polarizations. In another example, one of the two common first amplitude coefficients for the two antenna polarizations is fixed to 1, hence it is not reported by the UE.

In one example, for phase coefficient reporting, the value of $N_{PSK}$ (alphabet size) is configured with the higher layer parameter PhaseAlphabetSize, where $N_{PSK} \in \{4,8\}$ or $N_{PSK} \in \{4,8,16\}$ or $N_{PSK} \in \{8,16\}$ and the phase coefficient (corresponding to coefficient $c_{l,i,k}$) is $\phi_{l,i,k} = e^{j2\pi d_{l,i,k}/N_{PSK}}$. In another example, the value of $N_{PSK}$ (alphabet size) is fixed, for example to $N_{PSK}$=8 or $N_{PSK}$=16.

In one example, for amplitude coefficient $\{p_{l,i,k}^{(1)}\}$ or $\{p_{l,i,k}^{(2)}\}$ reporting, a 3-bit WB amplitude codebook is used. An example is shown in TABLE 3. For amplitude coefficient $\{p_{l,i,k}^{(2)}\}$ reporting, a 1-bit SB amplitude codebook is used. An example is shown in TABLE 4.

TABLE 3

Mapping of elements: $k_{l,i,k}^{(1)}$ to $p_{l,i,k}^{(1)}$

| $k_{l,i,k}^{(1)}$ | $p_{l,i,k}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 4

Mapping of elements: $k_{l,i,k}^{(2)}$ to $p_{l,i,k}^{(2)}$

| $k_{l,i,k}^{(2)}$ | $p_{l,i,k}^{(2)}$ |
|---|---|
| 0 | $\sqrt{1/2}$ |
| 1 | 1 |

The strongest coefficient is reported according to at least one of the following methods.

In one example, the strongest coefficient is not reported, and amplitude and phase of all coefficients are reported.

In one example, a strongest coefficient on layer l, l=1, . . . , v is reported out of all coefficients (i.e., out of LK coefficients in case of embodiment 1 and out of 2LK coefficients in case of embodiment 2).

In one example, the strongest coefficient on layer l, l=1, . . . , v is reported in a WB manner, i.e., for each layer, the strongest coefficient (out of L coefficients in case of embodiment 1 and out of 2L coefficients in case of embodiment 2) is reported that is common for all k=0, 1, . . . , K−1. This corresponds to a row in the coefficient matrix $C_l$, whose value can be set to one.

In one example, a strongest coefficient on layer l, l=1, . . . , v is reported for each value of k=0, 1, . . . , K−1, i.e., K strongest coefficients are reported, one per column of the coefficient matrix $C_l$.

Note that amplitude and phase of the strongest coefficient(s) is (are) not reported. Only one of these examples may be supported in the specification. Or, one of them may be configured via higher layer (RRC) signaling.

In one embodiment 5, the codebook to report enhanced Type II CSI according to the aforementioned embodiments 1-4 is a dual-stage codebook in which a PMI value corresponds to two codebook indices $i_1$ and $i_2$, where $i_1$ includes indices $i_{1,1}$ and $i_{1,2}$. The L vectors $\{a_l\}$ and K vectors $\{b_k\}$ are identified by the indices $i_{1,1}$ and $i_{1,2}$, where $$i_{1,1} = [q_1 \ q_2 \ q_3]$$

$$q_1 \in \{0, 1, \ldots, O_1 - 1\}$$

$$q_2 \in \{0, 1, \ldots, O_2 - 1\}$$

$$q_3 \in \{0, 1, \ldots, O_3 - 1\}$$

indicates the three-dimensional (3D) (cf. FIG. 9) rotation factors to select a 3D orthogonal DFT basis, and $$i_{1,2}[r_1 \ r_2]$$

$$r_1 \in \left\{0, 1, \ldots, \binom{N_1 N_2}{L} - 1\right\} \text{ and}$$

$$r_2 \in \left\{0, 1, \ldots, \binom{N_3}{K} - 1\right\}$$

indicates L and K orthogonal vectors in the selected 3D orthogonal DFT basis that form A and B matrices, where it is assumed that columns of A and B are reported jointly (e.g., Alt 3-3) and they are reported common for all of v layers. When A is reported common across layers, and B is reported independently across layers, then, $i_{1,2}=[r_1 \ r_2]$ where $$r_2 = [r_{2,1} \ \ldots \ r_{2,v}],$$

$$r_1 \in \left\{0, 1, \ldots, \binom{N_1 N_2}{L} - 1\right\}, \text{ and}$$

$$r_{2,l} \in \left\{0, 1, \ldots, \binom{N_3}{K_l} - 1\right\}.$$

When A is reported independently across layers, and B is reported common across layers, then, $i_{1,2}=[r_1 \ r_2]$ where $$r_1 = [r_{1,1} \ \ldots \ r_{1,v}],$$

$$r_{1,l} \in \left\{0, 1, \ldots, \binom{N_1 N_2}{L_l} - 1\right\}, \text{ and}$$

$$r_2 \in \left\{0, 1, \ldots, \binom{N_3}{K} - 1\right\}.$$

When A is reported independently across layers, and B is reported independently across layers, then, $i_{1,2}=[r_1 \ r_2]$ where $$r_1 = [r_{1,1} \ \ldots \ r_{1,v}], r_2 = [r_{2,1} \ \ldots \ r_{2,v}]$$

$$r_{1,l} \in \left\{0, 1, \ldots, \binom{N_1 N_2}{L_l} - 1\right\} \text{ and}$$

$$r_{2,l} \in \left\{0, 1, \ldots, \binom{N_3}{K_l} - 1\right\}.$$

Let $$n_1 = [n_1^{(0)}, \ldots, n_1^{(L-1)}]$$

$$n_2 = [n_2^{(0)}, \ldots, n_2^{(L-1)}]$$

$$n_3 = [n_3^{(0)}, \ldots, n_3^{(K-1)}]$$

$$n_1^{(i)} \in \{0, 1, \ldots, N_1 - 1\}$$

$n_2^{(i)} \in \{0, 1, \ldots, N_2 - 1\}$ $n_3^{(k)} \in \{0, 1, \ldots, N_3 - 1\}.$ Then the elements of $n_1$ and $n_2$ are found from $r_1$ and the elements of $n_3$ are found from $r_2$ using the algorithm in NR specification. When $n_1$ and $n_2$ are known, $r_1$ is found (likewise, when $n_3$ is known, $r_2$ is found) using the algorithm in NR specification.

The indices $m_1^{(i)}$ and $m_2^{(i)}$ of the L columns of the A matrix, and the indices $m_3^{(k)}$ of the K columns of the B matrix are given by $$m_1^{(i)} = O_1 n_1^{(i)} + q_1$$
$$m_2^{(i)} = O_2 n_2^{(i)} + q_2$$
$$m_3^{(k)} = O_3 n_3^{(k)} + q_3$$

for $i=0, 1, \ldots, L-1$ and $k=0, 1, \ldots, K-1$, and the corresponding vectors are given by $a_i = v_{m_1^{(i)} m_2^{(i)}}$ and $b_k = m_2^{(k)}$.

In an example, when $v=1$ or $2$, the codebook indices $i_1$ and $i_2$ are given by $$i_1 = \begin{cases} [i_{1,1} \; i_{1,2} \; i_{1,3,1} \; i_{1,4,1}] & v = 1 \\ [i_{1,1} \; i_{1,2} \; i_{1,3,1} \; i_{1,4,1} \; i_{1,3,2} \; i_{1,4,2}] & v = 2 \end{cases}$$

$$i_2 = \begin{cases} [i_{2,1,1}] & \text{SubbandAmplitude = 'OFF'}, v = 1 \\ [i_{2,1,1} \; i_{2,1,2}] & \text{SubbandAmplitude = 'OFF'}, v = 2 \\ [i_{2,1,1} \; i_{2,2,1}] & \text{SubbandAmplitude = 'ON'}, v = 2 \\ [i_{2,1,1} \; i_{2,2,1} \; i_{2,1,2} \; i_{2,2,2}] & \text{SubbandAmplitude = 'ON'}, v = 2 \end{cases}$$

where $i_{1,1}$ and $i_{1,2}$ are as explained in this embodiment, and the rest of the PMI components are according to LTE specification.

The strongest coefficient on layer l, $l=1, \ldots, v$ is identified by $i_{1,3,l} \in \{0, 1, \ldots, 2L-1\}$. The amplitude coefficient indicators $i_{1,4,l}$ and $i_{2,2,l}$ are $$i_{1,4,l} = [k_{l,0,0}^{(1)}, k_{l,1,0}^{(1)}, \ldots, k_{l,2L-1,0}^{(1)} \; k_{l,0,1}^{(1)}, k_{l,1,1}^{(1)}, \ldots,$$
$$k_{l,2L-1,1}^{(1)} \ldots k_{l,0,K-1}^{(1)}, k_{l,1,K-1}^{(1)}, \ldots, k_{l,2L-1,K-1}^{(1)}]$$

$$i_{2,2,l} = [k_{l,0,0}^{(2)}, k_{l,1,0}^{(2)}, \ldots, k_{l,2L-1,0}^{(2)} \; k_{l,0,1}^{(2)}, k_{l,1,1}^{(2)}, \ldots,$$
$$k_{l,2L-1,1}^{(2)} \ldots k_{l,0,K-1}^{(2)}, k_{l,1,K-1}^{(2)}, \ldots, k_{l,2L-1,K-1}^{(2)}]$$

$k_{l,i,k}^{(1)} \in \{0, 1, \ldots, 7\}$ $k_{l,i,k}^{(2)} \in \{0, 1\}$ for $l=1, \ldots, v$. The mapping from $k_{l,i,k}^{(1)}$ to the amplitude coefficient $p_{l,i,k}^{(1)}$ is given in TABLE 3 and the mapping from $k_{l,i,k}^{(2)}$ to the amplitude coefficient $p_{l,i,k}^{(2)}$ is given in TABLE 4.

The amplitude coefficients are represented by $$p_l^{(1)} = [p_{l,0,0}^{(1)}, p_{l,1,0}^{(1)}, \ldots, p_{l,2L-1,0}^{(1)} \; p_{l,0,1}^{(1)}, p_{l,1,1}^{(1)}, \ldots,$$
$$p_{l,2L-1,1}^{(1)} \ldots p_{l,0,K-1}^{(1)}, p_{l,1,K-1}^{(1)}, \ldots, p_{l,2L-1,K-1}^{(1)}]$$

$$p_l^{(2)} = [p_{l,0,0}^{(2)}, p_{l,1,0}^{(2)}, \ldots, p_{l,2L-1,0}^{(2)} \; p_{l,0,1}^{(2)}, p_{l,1,1}^{(2)}, \ldots,$$
$$p_{l,2L-1,1}^{(2)} \ldots p_{l,0,K-1}^{(2)}, p_{l,1,K-1}^{(2)}, \ldots, p_{l,2L-1,K-1}^{(2)}]$$

for $l = 1, \ldots, v.$

The phase coefficient indicators are $i_{2,1,l} = [d_{l,0,0}, d_{l,1,0}, \ldots, d_{l,2L-1,0} \; d_{l,0,1}, d_{l,1,1}, \ldots, d_{l,2L-1,1} \ldots d_{l,0,K-1}, d_{l,1,K-1}, \ldots, d_{l,2L-1,K-1}]$ for $l=1, \ldots, v$.

The amplitude and phase coefficient indicators are reported as follows.

In one example, the indicators, $k_{l,i_{1,3,l},k}^{(1)}=7$, $k_{l,i_{1,3,l},k}^{(2)}=1$, and $c_{l,i_{1,3,l},k}=0$ ($l=1, \ldots, v$ and $k=0, \ldots, K-1$). $k_{l,i_{1,3,l},k}^{(1)}$, $k_{l,i_{1,3,l},k}^{(2)}$, and $c_{l,i_{1,3,l},k}$ are not reported for $l=1, \ldots, v$ and $k=0, \ldots, K-1$.

In one example, the remaining $(2L-1)K$ elements of $i_{1,4,l}$ ($l=1, \ldots, v$) are reported, where $k_{l,i,k}^{(1)} \in \{0, 1, \ldots, 7\}$. For a given (l, k), where $l=1, \ldots, v$ and $k=0, \ldots, K-1$, let $M_{l,k}$ be the number of elements of $I_{1,4,l}$ that satisfy $k_{l,i,k}^{(1)}>0$.

In one example, for a given $k=0, 1, \ldots, K-1$, the remaining $2L-1$ elements of $i_{2,1,l}$ and $i_{2,2l}$ ($l=1, \ldots, v$) are reported as follows. In one instance, when SubbandAmplitude is set to "OFF," $k_{l,i,k}^{(2)}=1$ for $l=1, \ldots, v$, and $i=0, 1, \ldots, 2L-1$. $i_{2,2,l}$ is not reported for $l=1, \ldots, v$. For $l=1, \ldots, v$, the elements of $i_{2,1,l}$ corresponding to the coefficients that satisfy $k_{l,i,k}^{(1)}>0$, $i \neq i_{1,3,l}$, as determined by the reported elements of $i_{1,4,l}$, are reported, where $c_{l,i,k} \in \{0, 1, \ldots, N_{PSK}-1\}$ and the remaining $2L-M_{l,k}$ elements of $i_{2,1,l}$ are not reported and are set to $c_{l,i,k}=0$.

In one instance, when SubbandAmplitude is set to "ON," for $l=1, \ldots, v$, the elements of $i_{2,2,l}$ and $i_{2,1,l}$ corresponding to the min $(M_{l,k}, K^{(2)})-1$ strongest coefficients (excluding the strongest coefficient indicated by $i_{1,3,l}$), as determined by the corresponding reported elements of $i_{1,4,l}$ are reported, where $k_{l,i,k}^{(2)} \in \{0,1\}$ and $c_{l,i,k} \in \{0, 1, \ldots N_{PSK}-1\}$. The values of $K^{(2)}$ are given in TABLE 5. The remaining $2L-\min(M_{l,k}, K^{(2)})$ elements of $i_{2,2,l}$ are not reported and are set to $k_{l,i,k}^{(2)}=1$. The elements of $i_{2,1,l}$ corresponding to the $M_{l,k}-\min(M_{l,k}, K^{(2)})$ weakest non-zero coefficients are reported, where $c_{l,i,k} \in \{0,1,2,3\}$. The remaining $2L-M_{l,k}$ elements of $i_{2,1,l}$ are not reported and are set to $c_{l,i,k}=0$.

In one instance, when two elements, $k_{l,x,k}^{(1)}$ and $k_{l,y,k}^{(1)}$, of the reported elements of $i_{1,4,l}$ are identical ($k_{l,x,k}^{(1)}=k_{l,y,k}^{(1)}$), then element min (x, y) is prioritized to be included in the set of the min $(M_{l,k}, K^{(2)})-1$ strongest coefficients for $i_{2,1,l}$ and $i_{2,2,l}$ ($l=1, \ldots, v$) reporting.

TABLE 5

Full resolution subband coefficients when SubbandAmplitude is set to "ON"

| L | $K^{(2)}$ |
|---|---|
| 2 | 4 |
| 3 | 4 |
| 4 | 6 |

The codebooks for 1-2 layers are given in TABLE 6, and the quantity $\varphi_{l,i}$ is given $$\text{by } \varphi_{l,i,k} = \begin{cases} e^{j2\pi d_{l,i,k}}/N_{PSK} & SubbandAmplitude = \text{'OFF'} \\ e^{j2\pi d_{l,i,k}}/N_{PSK} & SubbandAmplitude = \text{'ON'}, \\ & \min(M_{l,k}, K^{(2)}) \text{ strongest coefficients} \\ & (\text{including } i_{1,3,l}) \text{ with } k^{(1)}_{l,i,k} > 0 \\ e^{j2\pi d_{l,i,k}}/4 & SubbandAmplitude = \text{'ON'}, \\ & M_{l,k} - \min(M_{l,k}, K^{(2)}) \text{ weakest} \\ & \text{coefficients with } k^{(1)}_{l,i,k} > 0 \\ 1 & SubbandAmplitude = \text{'ON'}, \\ & 2L - M_{l,k} \text{ coefficients} \\ & \text{with } k^{(1)}_{l,i,k} = 0 \end{cases}$$

sponds to three codebook indices $i_0$, $i_1$, and $i_2$, where either $i_0=[q_3\ r_2]$ or $i_0$ includes indices $i_{0,1}$ and $i_{0,2}$ such that $i_{0,1}=q_3$ and $i_{0,2}=r_2$, and $i_1$ includes indices $i_{1,1}$ and $i_{1,2}$ such that $i_{1,1}=[q_1\ q_2]$ and $i_{1,2}=r_1$.

In one embodiment 6A, which is variation of the aforementioned embodiment 6, the codebook to report enhanced Type II CSI according to the aforementioned embodiments 1-4 is a triple-stage codebook in which a PMI value corresponds to three codebook indices $i_1$, $i_2$, and $i_3$ where $i_1$ includes indices $i_{1,1}$ and $i_{1,2}$ such that $i_{1,1}=[q_1\ q_2]$ and $i_{1,2}=r_1$; and either $i_3=[q_3\ r_2]$ or $i_3$ includes indices $i_{3,1}$ and $i_{3,2}$ such that $i_{3,1}=q_3$ and $i_{3,2}=r_2$.

In one embodiment 7, which is a variation of the aforementioned embodiment 1, a UE is configured with higher layer parameter CodebookType set to "TypeII-PortSelection-Compression" or "TypeIII-PortSelection" for an enhanced Type II CSI reporting with port selection in which the pre-coders for all SBs and for a given layer l=1, . . . , v, where v is the associated RI value, is given by

TABLE 6

Codebook for 1-layer and 2-layer CSI reporting using antenna ports 3000 to 2999 + $P_{CSI-RS}$ Layers v = 1
$$W^{(1)}_{q_1,q_2,q_3,n_1,n_2,n_3,p_1^{(1)},p_1^{(2)},i_{2,1,1}} = W^1_{q_1,q_2,q_3,n_1,n_2,n_3,p_1^{(1)},p_1^{(2)},i_{2,1,1}}$$

v = 2
$$W^{(2)}_{q_1,q_2,q_3,n_1,n_2,n_3,p_1^{(1)},p_1^{(2)},i_{2,1,1},p_2^{(1)},p_2^{(2)},i_{2,1,2}} = \frac{1}{\sqrt{2}}\begin{bmatrix} W^1_{q_1,q_2,q_3,n_1,n_2,n_3,p_1^{(1)},p_1^{(2)},i_{2,1,1}} \\ W^2_{q_1,q_2,q_3,n_1,n_2,n_3,p_2^{(1)},p_2^{(2)},i_{2,1,2}} \end{bmatrix}$$

$$W^l_{q_1,q_2,q_3,n_1,n_2,n_3,p_l^{(1)},p_l^{(2)},c_l} = \frac{1}{\sqrt{N_1 N_2 N_3}}\begin{bmatrix} \sum_{k=0}^{K-1}\frac{1}{\eta_k}\sum_{i=0}^{L-1} v_{m_1^{(i)},m_2^{(i)}} w^H_{m_3^{(k)}} p^{(1)}_{l,i,k} p^{(2)}_{l,i,k} \varphi_{l,i,k} \\ \sum_{k=0}^{K-1}\frac{1}{\eta_k}\sum_{i=0}^{L-1} v_{m_1^{(i)},m_2^{(i)}} w^H_{m_3^{(k)}} p^{(1)}_{l,i+L,k} p^{(2)}_{l,i+L,k} \varphi_{l,i+L,k} \end{bmatrix}, l = 1, 2$$

where $$\eta_k = \sqrt{\sum_{i=0}^{2L-1} (p^{(1)}_{l,i,k} p^{(2)}_{l,i,k})^2}$$

or $$W^l_{q_1,q_2,q_3,n_1,n_2,n_3,p_l^{(1)},p_l^{(2)},c_l} = \begin{bmatrix} \sum_{k=0}^{K-1}\frac{1}{\eta_k}\sum_{i=0}^{L-1} v_{m_1^{(i)},m_2^{(i)}} w^H_{m_3^{(k)}} p^{(1)}_{l,i,k} p^{(2)}_{l,i,k} \varphi_{l,i,k} \\ \sum_{k=0}^{K-1}\frac{1}{\eta_k}\sum_{i=0}^{L-1} v_{m_1^{(i)},m_2^{(i)}} w^H_{m_3^{(k)}} p^{(1)}_{l,i+L,k} p^{(2)}_{l,i+L,k} \varphi_{l,i+L,k} \end{bmatrix}, l = 1, 2,$$

where columns of $W^l_{q_1,q_2,q_3,n_1,n_2,n_3,p_l^{(1)},p_l^{(2)},c_l}$ are normalized to norm 1 and the mappings from $i_1$ to $q_1$, $q_2$, $q_3$, $n_1$, $n_2$, $n_3$, $p_1^{(1)}$, and $p_2^{(1)}$, and from $i_2$ to $i_{2,1,1}$, $i_{2,1,2}$, $p_1^{(2)}$ and $p_2^{(2)}$ are as described above, including the ranges of the constituent indices of $i_1$ and $i_2$.

In one embodiment 5A, which is variation of the aforementioned embodiment 5, the PMI $i_1$ includes indices $i_{1,1}$ and $i_{1,2}$ that identify the L vectors $\{a_i\}$ as $i_{1,1}=[q_1\ q_2]$ and $i_{1,2}=r_1$; and also includes indices $i_{1,5}$ and $i_{1,6}$ that identify the K vectors $\{b_k\}$ as $i_{1,5}=q_3$ and $i_{1,6}=r_2$.

In one embodiment 5B, which is variation of the aforementioned embodiment 5, the PMI $i_1$ includes indices $i_{1,1}$, $i_{1,2}$, and $i_{1,5}$ such that $i_{1,1}=[q_1\ q_2\ q_3]$, $i_{1,2}=r_1$, and $i_{1,5}=r_2$.

In one embodiment 6, the codebook to report enhanced Type II CSI according to the aforementioned embodiments 1-4 is a triple-stage codebook in which a PMI value corre- $$W^l = AC_l B^H = [a_0\ a_1\ \ldots\ a_{L-1}]\begin{bmatrix} c_{l,0,0} & c_{l,0,1} & \ldots & c_{l,0,K-1} \\ c_{l,1,0} & c_{l,1,1} & \ldots & c_{l,1,K-1} \\ \vdots & \vdots & \vdots & \vdots \\ c_{l,L-1,0} & c_{l,L-1,1} & \ldots & c_{l,L-1,K-1} \end{bmatrix}$$

$$[b_0\ b_1\ \ldots\ b_{K-1}]^H = \sum_{k=0}^{K-1}\sum_{i=0}^{L-1} c_{l,i,k}(a_i b_k^H),$$

Where $a_i$ is a $N_1N_2 \times 1$ port selection column vector if antenna ports at the gNB are co-polarized, and is a $2N_1N_2 \times 1$ port selection column vector if antenna ports at the gNB are dual-polarized or cross-polarized, where a port selection vector is a defined as a vector which contains a value of 1 in one element and zeros elsewhere, $N_1$, $N_2$, $N_3$, $b_k$, and $c_{l,i,k}$ are defined as in the aforementioned embodiment 1. The rest of the details are similar to the aforementioned embodiment 1.

In one embodiment 7A, which is a variation of the aforementioned embodiment 2, a UE is configured with higher layer parameter CodebookType set to "TypeII-Port-Selection-Compression" or "TypeIII-PortSelection" for an enhanced Type II CSI reporting with port selection in which the pre-coders for all SBs and for a given layer $l=1, \ldots, v$, where v is the associated RI value, is given by $$W^l = \begin{bmatrix} A & 0 \\ 0 & A \end{bmatrix} C_l B^H = \begin{bmatrix} a_0 \ a_1 \ \ldots \ a_{L-1} & 0 \\ 0 & a_0 \ a_1 \ \ldots \ a_{L-1} \end{bmatrix}$$

$$\begin{bmatrix} c_{l,0,0} & c_{l,0,1} & \cdots & c_{l,0,K-1} \\ c_{l,1,0} & c_{l,1,1} & \cdots & c_{l,1,K-1} \\ \vdots & \vdots & \vdots & \vdots \\ c_{l,2L-1,0} & c_{l,2L-1,1} & \cdots & c_{l,2L-1,K-1} \end{bmatrix}$$

$$[b_0 \ b_1 \ \ldots \ b_{K-1}]^H = \begin{bmatrix} \sum_{k=0}^{K-1}\sum_{i=0}^{L-1} c_{l,i,k}(a_i b_k^H) \\ \sum_{k=0}^{K-1}\sum_{i=0}^{L-1} c_{l,i+L,k}(a_i b_k^H) \end{bmatrix},$$

Where $a_i$ is a $N_1N_2 \times 1$ port selection column vector, where a port selection vector is a defined as a vector which contains a value of 1 in one element and zeros elsewhere, $N_1$, $N_2$, $N_3$, $b_k$, and $c_{l,i,k}$ are defined as in the aforementioned embodiment 2. The rest of the details are similar to the aforementioned embodiment 2.

In one embodiment 7B, which is a variation of the aforementioned embodiment 3, the UE is configured to report columns of $A = [a_0 \ a_1 \ \ldots \ a_{L-1}]$, and $B = [b_0 \ b_1 \ \ldots \ b_{K-1}]$ matrices in a WB manner, i.e., one A and one B are reported common for the entire CSI reporting band. For instance, the L antenna ports per polarization or column vectors of A are selected by the index $q_1$, where $$q_1 \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil$$

bits), and the value of d is configured with the higher layer parameter PortSelectionSamplingSize, where $d \in \{1,2,3,4\}$ and $$d \leq \min\left(\frac{P_{CSI-RS}}{2}, L\right).$$

The K column vectors of B are reported jointly (which requires $$\left\lceil \log_2 \binom{N_3}{K} \right\rceil$$

bits). In an example, to report columns of B, the over-sampled DFT codebook is used. For instance, $b_k = w_k$, where the quantity $w_k$ is given by $$w_k = \left[1 \ e^{j\frac{2\pi k}{O_3 N_3}} \ \ldots \ e^{j\frac{2\pi k(N_3-1)}{O_3 N_3}}\right].$$

The value of $N_3$ is configured by configuring the Carrier bandwidth part (PRBs) and Subband size (PRBs) according to LTE specification. The value of $O_3$ is fixed, for example to 1 or 2 or 4. To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

In one embodiment 7C, which is a variation of the aforementioned embodiment 4, the UE is configured to report the amplitude and phase of coefficients $\{c_{l,i,k}\}$ separately as $c_{l,i,k} = p_{l,i,k}^{(1)} p_{l,i,k}^{(2)} \phi_{l,i,k}$ according to at least one of the alternatives in the aforementioned embodiment 4. The rest of the details are similar to the aforementioned embodiment 4.

In one embodiment 7D, which is a variation of the aforementioned embodiment 5, the codebook to report enhanced Type II CSI according to the aforementioned embodiments 7/7A/7B/7D is a dual-stage codebook in which a PMI value corresponds to two codebook indices $i_1$ and $i_2$ where $i_1$ includes indices $i_{1,1}$ and $i_{1,2}$. The L vectors $\{a_i\}$ and K vectors $\{b_k\}$ are identified by the indices $i_{1,1}$ and $i_{1,2}$, where $$i_{1,1} = [q_1 \ q_3]$$

$$q_1 \in \left\{0, 1, \ldots, \left\lceil \frac{P_{CSI-RS}}{2d} \right\rceil - 1\right\}, \text{ and}$$

$$q_3 \in \{0, 1, \ldots, O_3 - 1\}$$

$$i_{1,2} = r_2 \in \left\{0, 1, \ldots, \binom{N_3}{K} - 1\right\}.$$

The L port selection vectors (columns of A) are given by $a_i = v_{i_{1,1}d+1}$. Let $$n_3 = [n_3^{(0)}, \ldots, n_3^{(K-1)}]$$

$$n_3^{(k)} \in \{0, 1, \ldots, N_3 - 1\}.$$

Then the elements of $n_3$ are found from $r_2$ using the algorithm in the NR specification. When $n_3$ is known, $r_2$ is found using the algorithm in NR specification. The indices $m_3^{(k)}$ of the K columns of the B matrix are given by $m_3^{(k)} = O_3 n_3^{(k)} + q_3$ for $k = 0, 1, \ldots, K-1$, and the corresponding vectors are given by $b_k = m_2^{(k)}$.

In one example, when v=1 or 2, the codebook indices $i_1$ and $i_2$ are as follows:

$$i_1 = \begin{cases} [i_{1,1} \; i_{1,3,1} \; i_{1,4,1}] & v = 1 \\ [i_{1,1} \; i_{1,3,1} \; i_{1,4,1} \; i_{1,3,2} \; i_{1,4,2}] & v = 2 \end{cases}$$

$$i_2 = \begin{cases} [i_{2,1,1}] & SubbandAmplitude = \text{'OFF'}, v = 1 \\ [i_{2,1,1} \; i_{2,1,2}] & SubbandAmplitude = \text{'OFF'}, v = 2 \\ [i_{2,1,1} \; i_{2,2,1}] & SubbandAmplitude = \text{'ON'}, v = 1 \\ [i_{2,1,1} \; i_{2,2,1} \; i_{2,1,2} \; i_{2,2,2}] & SubbandAmplitude = \text{'ON'}, v = 2 \end{cases}$$

where $i_{1,1}$ and $i_{1,2}$ are as explained in this embodiment, and the rest of the PMI components are according to the simple extension of NR specification explained in the aforementioned embodiment 5. The codebooks for 1-2 layers are given in TABLE 7.

TABLE 7

Codebook for 1-layer and 2-layer CSI reporting using antenna ports 3000 to 2999 + $P_{CSI-RS}$ Layers v = 1  $W^{(1)}_{q_1,q_3,n_3,p_1^{(1)},p_1^{(2)},i_{2,1,1}} = W^1_{q_1,q_3,n_3,p_1^{(1)},p_1^{(2)},i_{2,1,1}}$ v = 2  $W^{(2)}_{q_1,q_3,n_3,p_1^{(1)},p_1^{(2)},i_{2,1,1},p_2^{(1)},p_2^{(2)},i_{2,1,2}} = \frac{1}{\sqrt{2}} [W^1_{q_1,q_3,n_3,p_1^{(1)},p_1^{(2)},i_{2,1,1}} \quad W^2_{q_1,q_3,n_3,p_1^{(1)},p_1^{(2)},i_{2,1,1}}]$ $$W^l_{q_1,q_3,n_3,p_l^{(1)},p_l^{(2)},c_l} = \frac{1}{\sqrt{N_3}} \begin{bmatrix} \sum_{k=0}^{K-1} \frac{1}{\eta_k} \sum_{i=0}^{L-1} v_{q_1 d + i} w^H_{m_3^{(k)}} p^{(1)}_{l,i,k} p^{(2)}_{l,i,k} \varphi_{l,i,k} \\ \sum_{k=0}^{K-1} \frac{1}{\eta_k} \sum_{i=0}^{L-1} v_{q_1 d + i} w^H_{m_3^{(k)}} p^{(1)}_{l,i+L,k} p^{(2)}_{l,i+L,k} \varphi_{l,i+L,k} \end{bmatrix}, l = 1, 2,$$

where $$\eta_k = \sqrt{\sum_{i=0}^{2L-1} (p^{(1)}_{l,i,k} p^{(2)}_{l,i,k})^2}$$

or $$W^l_{q_1,q_3,n_3,p_l^{(1)},p_l^{(2)},c_l} = \begin{bmatrix} \sum_{k=0}^{K-1} \frac{1}{\eta_k} \sum_{i=0}^{L-1} v_{q_1 d + i} w^H_{m_3^{(k)}} p^{(1)}_{l,i,k} p^{(2)}_{l,i,k} \varphi_{l,i,k} \\ \sum_{k=0}^{K-1} \frac{1}{\eta_k} \sum_{i=0}^{L-1} v_{q_1 d + i} w^H_{m_3^{(k)}} p^{(1)}_{l,i+L,k} p^{(2)}_{l,i+L,k} \varphi_{l,i+L,k} \end{bmatrix}, l = 1, 2$$

where columns of $W^1_{q_1,q_3,n_3,p_l^{(1)},p_l^{(2)},c_l}$ are normalized to norm 1 and the mappings from $i_1$ to $q_1, q_3, n_3, p_1^{(1)}$, and $p_2^{(1)}$, and from $i_2$ to $i_{2,1,1}, i_{2,1,2}, p_1^{(2)}$ and $p_2^{(2)}$ are as described above, including the ranges of the constituent indices of $i_1$ and $i_2$.

In a variation of this embodiment, the PMI $i_1$ includes indices $i_{1,1}$ that identifies the L vectors $\{a_i\}$ as $i_{1,1}=q_1$; and also includes indices $i_{1,2}$ and $i_{1,5}$ that identify the K vectors $\{b_k\}$ as $i_{1,2}=q_3$ and $i_{1,5}=r_2$.

In one embodiment 7E, which is a variation of the aforementioned embodiment 6, the codebook to report enhanced Type II CSI according to the aforementioned embodiments 7/7A/7B/7C/7D is a triple-stage codebook in which a PMI value corresponds to three codebook indices $i_0$, $i_1$ and $i_2$, where either $i_0=[q_3 \; r_2]$ or $i_0$ includes indices $i_{0,1}$ and $i_{0,2}$ such that $i_{0,1}=q_3$ and $i_{0,2}=r_2$, and $i_1$ includes indices $i_{1,1}$ such that $i_{1,1}=q_1$.

In a variation of this embodiment, the codebook to report enhanced Type II CSI according to the aforementioned embodiments 7/7A/7B/7C/7D is a triple-stage codebook in which a PMI value corresponds to three codebook indices $i_1$, $i_2$ and $i_3$ where $i_1$ includes indices $i_{1,1}$ such that $i_{1,1}=q_1$. Either $i_3=[q_3 \; r_2]$ or $i_3$ includes indices $i_{3,1}$ and $i_{3,2}$ such that $i_{3,1}=q_3$ and $i_{3,2}=r_2$.

In one embodiment 7F, which is a combination of the aforementioned embodiments 1A/2A and the aforementioned embodiments 7/7A, in which the basis vectors $B_i = [b_{i,0} \; b_{i,1} \; \ldots \; b_{i,K-1}]$ is selected independently for each basis vector $a_i$. The rest of the details of the aforementioned embodiments 1A/2A are straightforwardly applicable to this embodiment also.

In one embodiment 8, which is a variation of the aforementioned embodiment 1, a UE is configured with higher layer parameter CodebookType set to "TypeII-Compression" or "TypeIII" for an enhanced Type II CSI reporting in which the pre-coders for all SBs and for a given layer $l=1, \ldots, v$, where v is the associated RI value, is given by $W^l=XC_l=\sum_{k=0}^{K-1}\sum_{i=0}^{L-1}c_{l,i,k}x_{i,k}$, where $X=[x_{0,0} \; x_{1,0} \; \ldots \; x_{L-1,0} \; x_{0,1} \; x_{1,1} \; \ldots \; x_{L-1,1} \; \ldots \; x_{0,K-1} \; x_{1,K-1} \; \ldots \; x_{L-1,K-1}]$, $x_{i,k}=\text{vec}(a_i b_k^H)$, where $a_i$ is the i-th column of the matrix A, and $b_k$ is the k-th column of the matrix B. The notation vec(M) transforms matrix M into a column vector by concatenating columns of M. $N_1$, $N_2$, $N_3$, $a_i$, $b_k$, and $c_{l,i,k}$ are defined as in the aforementioned embodiment 1. The rest of the details are similar to the aforementioned embodiment 1.

In one embodiment 8A, which is a variation of the aforementioned embodiment 2, a UE is configured with higher layer parameter CodebookType set to "TypeII-Compression" or "TypeIII" for an enhanced Type II CSI reporting in which the pre-coders for all SBs and for a given layer $l=1, \ldots, v$, where v is the associated RI value, is given by $$W^l = \begin{bmatrix} X & 0 \\ 0 & X \end{bmatrix} C_l = \begin{bmatrix} \sum_{k=0}^{K-1} \sum_{i=0}^{L-1} c_{l,i,k} \, x_{i,k} \\ \sum_{k=0}^{K-1} \sum_{i=0}^{L-1} c_{l,i+L,k} \, x_{i,k} \end{bmatrix},$$

where $N_1$, $N_2$, $N_3$, $a_i$, $b_k$, and $c_{l,i,k}$ are defined as in the aforementioned embodiment 2. The rest of the details are similar to the aforementioned embodiment 2.

Assuming the dual-stage codebook in the aforementioned embodiment 5, the codebooks for 1-2 layers are given in TABLE 6 except that $$W^l_{q_1,q_2,q_3,n_1,n_2,n_3,p_l^{(1)},p_l^{(2)},c_l} = \frac{1}{\sqrt{N_1 N_2 N_3}} \begin{bmatrix} \sum_{k=0}^{K-1} \frac{1}{\eta_k} \sum_{i=0}^{L-1} z_{m_1^{(i)},m_2^{(i)},m_3^{(i)}} p_{l,i,k}^{(1)} p_{l,i,k}^{(2)} \varphi_{l,i,k} \\ \sum_{k=0}^{K-1} \frac{1}{\eta_k} \sum_{i=0}^{L-1} z_{m_1^{(i)},m_2^{(i)},m_3^{(i)}} p_{l,i+L,k}^{(1)} p_{l,i+L,k}^{(2)} \varphi_{l,i+L,k} \end{bmatrix},$$

where $z_{l,m,k} = \begin{bmatrix} v_{l,m} & e^{j\frac{2\pi k}{O_3 N_3}} v_{l,m} & \ldots & e^{j\frac{2\pi k(N_3-1)}{O_3 N_3}} v_{l,m} \end{bmatrix}^T$.

In one embodiment 8B, which is a combination of the aforementioned embodiment 7 (or variations) and 8/8A, a UE is configured with higher layer parameter Codebook-Type set to "TypeII-PortSelection-Compression" or "TypeIII-PortSelection" for an enhanced Type II CSI reporting in which the pre-coders for all SBs and for a given layer l=1, ..., v, where v is the associated RI value, is given by $W^l$ defined as in the aforementioned embodiment 8/8A except that the vectors $a_i$ are replaced with the port selection vectors defined as in the aforementioned embodiment 7 (or variations). Assuming the dual-stage codebook in the aforementioned embodiment 7D, the codebooks for 1-2 layers are given in TABLE 7 except that $$W^l_{q_1,q_3,n_3,p_l^{(1)},p_l^{(2)},c_l} = \frac{1}{\sqrt{N_3}} \begin{bmatrix} \sum_{k=0}^{K-1} \frac{1}{\eta_k} \sum_{i=0}^{L-1} z_{q_1 d + i, m_3^{(k)}} p_{l,i,k}^{(1)} p_{l,i,k}^{(2)} \varphi_{l,i,k} \\ \sum_{k=0}^{K-1} \frac{1}{\eta_k} \sum_{i=0}^{L-1} z_{q_1 d + i, m_3^{(k)}} p_{l,i+L,k}^{(1)} p_{l,i+L,k}^{(2)} \varphi_{l,i+L,k} \end{bmatrix},$$

where $z_{m,k} = \begin{bmatrix} v_m & e^{j\frac{2\pi k}{O_3 N_3}} v_m & \ldots & e^{j\frac{2\pi k(N_3-1)}{O_3 N_3}} v_m \end{bmatrix}^T$.

In one embodiment 9, a UE is configured with higher layer parameter CodebookType set to "TypeII-Compression" or "TypeIII" for an enhanced Type II CSI reporting in which the pre-coders for all SBs and for a given layer l=1, ..., v, where v is the associated RI value, is given by $W^l = XC_l = \sum_{i=0}^{L-1} c_{l,i} x_i$, where: $X = [x_0 \; x_1 \; \ldots \; x_{L-1}]$, $x_i = a_i b_i^H$ (cf. the aforementioned embodiment 1) or $x_i = \text{vec}(a_i b_i^H)$ (cf. the aforementioned embodiment 8), where $a_i$ and $b_i$ are the i-th pair of matrices, $c_{l,i}$ is a complex coefficient, and $N_1$, $N_2$, $N_3$, $a_i$, and $b_k$ are defined as in the aforementioned embodiment 1.

The values of $N_1$, $N_2$, and $N_3$ are determined according to some embodiments of the present disclosure. The value of L is configured with the higher layer parameter NumberOf-Beams, where $L \in \{2, 3, 4, \ldots, L_{max}\}$ and an example of $L_{max} = 16$.

In one embodiment 9A, a UE is configured with higher layer parameter CodebookType set to "TypeII-Compression" or "TypeIII" for an enhanced Type II CSI reporting in which the pre-coders for all SBs and for a given layer l=1, ..., v, where v is the associated RI value, is given by $$W^l = \begin{bmatrix} X & 0 \\ 0 & X \end{bmatrix} C_l = \begin{bmatrix} \sum_{i=0}^{L-1} c_{l,i} \, x_i \\ \sum_{i=0}^{L-1} c_{l,i+L} \, x_i \end{bmatrix},$$

where $N_1$, $N_2$, $N_3$, $a_i$, $b_k$, and $c_{l,i,k}$ are defined as in the aforementioned embodiment 2.

In one embodiment 9B, a UE is configured with higher layer parameter CodebookType set to "TypeII-PortSelection-Compression" or "TypeIII-PortSelection" for enhanced Type II CSI reporting in which the pre-coders for all SBs and for a given layer l=1, ..., v, where v is the associated RI value, is given by $W^l$ defined as in the aforementioned embodiment 9/9A except that the vectors $a_i$ are replaced with the port selection vectors defined as in the aforementioned embodiment 7 (or variations).

Figure 14:
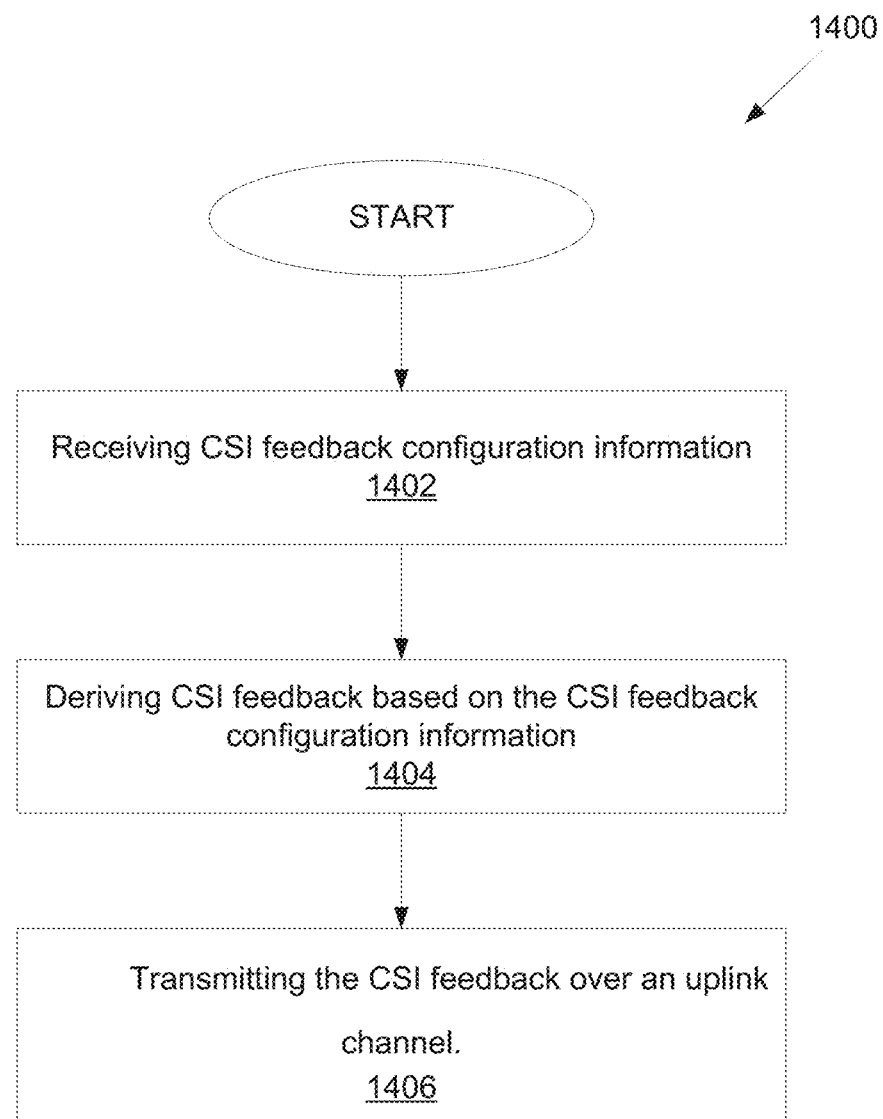
FIG. 14 illustrates a flow chart of a method for CSI feedback, as may be performed by a user equipment (UE), according to embodiments of the present disclosure.

FIG. 14 illustrates a flow chart of a method 1400 for CSI feedback, as may be performed by a user equipment (UE), according to embodiments of the present disclosure.

As illustrated in FIG. 14, the method 1400 begins in step 1402. In step 1402, the UE (e.g., 111-116 as illustrated in FIG. 1), the UE receives, from a base station (BS), CSI feedback configuration information including a number ($N_{SB}$) of subbands (SB) and a number (R) of frequency domain (FD) units per SB, wherein $N_{SB}$ and R determine a total number ($N_3$) of FD units.

In step 1402, $N_3 = N_{SB} \times R$. In step 1402, $N_{3,size} = 1/R \times N_{SB,size}$, where $N_{3,size}$ is a FD unit size and $N_{SB,size}$ is a SB size; and the FD unit size and the SB size are determined based on a number of consecutive physical resource blocks (PRBs).

In one embodiment, R is configured from {1, 2} in step 1402.

In one embodiment, in step 1402, R is configured from multiple candidate values when the UE reports, via UE capability signaling, capability information indicating that the UE supports multiple R values; or R is set to a default value 1.

In step 1402, the $N_3$ precoding matrices for the total number ($N_3$) of FD units are determined by columns of $W = 1/\sqrt{v}[W^1 \; W^2 \; \ldots \; W^v]$, where $$W^l = \begin{bmatrix} A_l & 0 \\ 0 & A_l \end{bmatrix} C_l B_l^H = \begin{bmatrix} \sum_{k=0}^{K-1} \sum_{i=0}^{L-1} c_{l,i,k} \, (a_{l,i} b_{l,k}^H) \\ \sum_{k=0}^{K-1} \sum_{i=0}^{L-1} c_{l,i+L,k} \, (a_{l,i} b_{l,k}^H) \end{bmatrix},$$

l is a layer index with a range of l=1, ..., v, v is an associated rank indicator (RI) value, and $A_l$, $B_l$, and $C_l$ are indicated by the PMI for each l=1, ..., v, and wherein: $A_l = [a_{l,0} \; a_{l,1} \; \ldots \; a_{l,L-1}]$, $a_{l,i}$ is a $N_1 N_2 \times 1$ column vector for spatial domain (SD) antenna ports, where $N_1$ and $N_2$ are number of antenna ports, respectively, with a same antenna polarization in a first and a second dimensions of a two-dimensional dual-polarized channel state information-reference signal (CSI-RS) antenna ports at the BS; $B_l=[b_{l,0} \ b_{l,1} \ldots b_{l,K-1}]$, $b_{l,k}$ is a $N_3 \times 1$ column vector for FD units; $C_l$ is a $2L \times K$ matrix comprising complex coefficients $c_{l,i,k}=p_{l,i,k}^{(1)} p_{l,i,k}^{(2)} \phi_{l,i,k}$, where $p_{l,i,k}^{(1)}$ is a first amplitude coefficient, $p_{l,i,k}^{(2)}$ is a second amplitude coefficient, and $\phi_{l,i,k}$ is a phase coefficient; a number (L) of column vectors for SD antenna ports is configured; from a set that includes {2, 4}; and a number (K) of column vectors for FD units is determined as $K=\lceil p \times N_3/R \rceil$, where p is configured from a set that includes {½, ¼}.

In step 1402, for v>1, $A_1=A_2=\ldots=A_v$, which implies that a set of L column vectors for SD antenna ports that are common for all v layers is reported via PMI.

In step 1404, the UE derives CSI feedback based on the CSI feedback configuration information, wherein the CSI feedback includes a precoding matrix indicator (PMI) indicating a precoding matrix for each FD unit of the total number ($N_3$) of FD units.

In step 1406, the UE transmits the CSI feedback over an uplink channel.

Figure 15:
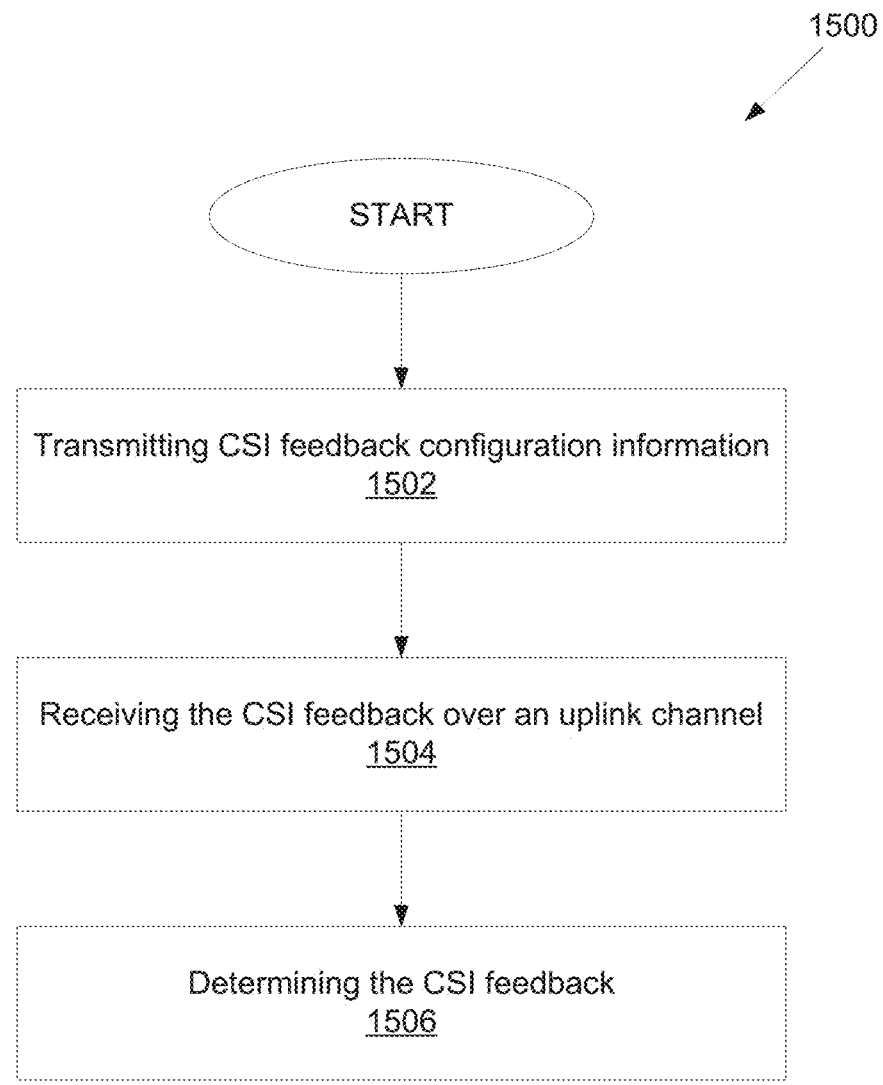
FIG. 15 illustrates a flow chart of another method for CSI feedback, as may be performed by a base station (BS), according to embodiments of the present disclosure.

FIG. 15 illustrates a flow chart of another method 1500 for CSI feedback, as may be performed by a base station (BS), according to embodiments of the present disclosure.

As illustrated in FIG. 15, the BS (e.g., 101-103 as illustrated in FIG. 1) begins the method 1500 in step 1502.

In step 1502, the BS transmit, to a user equipment (UE), CSI feedback configuration information including a number ($N_{SB}$) of subbands (SB) and a number (R) of frequency domain (FD) units per SB, wherein $N_{SB}$ and R determine a total number ($N_3$) of FD units.

In step 1502, $N_3=N_{SB} \times R$. In step 1402, $N_{3,size}=1/R \times N_{SB,size}$, where $N_{3,size}$ is a FD unit size and $N_{SB,size}$ is a SB size; and the FD unit size and the SB size are determined based on a number of consecutive physical resource blocks (PRBs).

In one embodiment, R is configured from {1, 2} in step 1502.

In one embodiment, in step 1502, R is configured from multiple candidate values when the UE reports, via UE capability signaling, capability information indicating that the UE supports multiple R values; or R is set to a default value 1.

In step 1502, the $N_3$ precoding matrices for the total number ($N_3$) of FD units are determined by columns of $W=1/\sqrt{v}[W^1 \ W^2 \ldots W^v]$, where $$W^l = \begin{bmatrix} A_l & 0 \\ 0 & A_l \end{bmatrix} C_l B_l^H = \begin{bmatrix} \sum_{k=0}^{K-1} \sum_{i=0}^{L-1} c_{l,i,k}(a_{l,i}b_{l,k}^H) \\ \sum_{k=0}^{K-1} \sum_{i=0}^{L-1} c_{l,i+L,k}(a_{l,i}b_{l,k}^H) \end{bmatrix},$$

l is a layer index with a range of l=1, ..., v, v is an associated rank indicator (RI) value, and $A_l$, $B_l$, and $C_l$ are indicated by the PMI for each l=1, ..., v, and wherein: $A_l=[a_{l,0} \ a_{l,1} \ldots a_{l,L-1}]$, $a_{l,i}$ is a $N_1 N_2 \times 1$ column vector for spatial domain (SD) antenna ports, where $N_1$ and $N_2$ are number of antenna ports, respectively, with a same antenna polarization in a first and a second dimensions of a two-dimensional dual-polarized channel state information-reference signal (CSI-RS) antenna ports at the BS; $B_l=[b_{l,0} \ b_{l,1} \ldots b_{l,K-1}]$, $b_{l,k}$ is a $N_3 \times 1$ column vector for FD units; $C_l$ is a $2L \times K$ matrix comprising complex coefficients $c_{l,i,k}=p_{l,i,k}^{(1)} p_{l,i,k}^{(2)} \phi_{l,i,k}$, where $p_{l,i,k}^{(1)}$ is a first amplitude coefficient, $p_{l,i,k}^{(2)}$ is a second amplitude coefficient, and $\phi_{l,i,k}$ is a phase coefficient; a number (L) of column vectors for SD antenna ports is configured from a set that includes {2, 4}; and a number (K) of column vectors for FD units is determined as $K=\lceil p \times N_3/R \rceil$, where p is configured from a set that includes {½, ¼}.

In step 1502, for v>1, $A_1=A_2=\ldots=A_v$, which implies that a set of L column vectors for SD antenna ports that are common for all v layers is reported via PMI.

In step 1504, the BS receives, from the UE, the CSI feedback over an uplink channel.

In step 1506, the BS determines the CSI feedback that is derived based on the CSI feedback configuration information transmitted to the UE, the CSI feedback including a precoding matrix indicator (PMI) indicating a precoding matrix for each FD unit of the total number ($N_3$) of FD units.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in a wireless communication system, the UE comprising:

a transceiver configured to receive, from a base station (BS), CSI feedback configuration information including a number ($N_{SB}$) of subbands (SBs) and a number (R) of frequency domain (FD) units per SB, wherein $N_{SB}$ and R determine a total number ($N_3$) of FD units for precoding matrices and wherein R corresponds to a number of precoding matrices per SB; and a processor operably connected to the transceiver, the processor configured to derive CSI feedback based on the CSI feedback configuration information, wherein the CSI feedback includes a precoding matrix indicator (PMI) indicating a precoding matrix for each FD unit of the total number ($N_3$) of FD units, which includes R number of precoding matrices for each of the $N_{SB}$ SBs, wherein the transceiver is further configured to transmit the CSI feedback over an uplink channel.

2. The UE of claim 1, wherein $N_3=N_{SB} \times R$.

3. The UE of claim 1, wherein the PMI includes an indicator indicating an index of a strongest coefficient per layer of the CSI feedback.

4. The UE of claim 1, wherein R is configured from {1, 2}.

5. The UE of claim 1, wherein:

R is configured from multiple candidate values when the UE reports, via UE capability signaling, capability information indicating that the UE supports multiple R values; or R is set to a default value 1.

6. The UE of claim 1, wherein:
the $N_3$ precoding matrices for the total number ($N_3$) of FD units are determined by columns of $$W = \frac{1}{\sqrt{v}}[W^1 \ W^2 \ \ldots \ W^v], \text{ where}$$

$$W^l = \begin{bmatrix} A_l & 0 \\ 0 & A_l \end{bmatrix} C_l B_l^H = \begin{bmatrix} \sum_{k=0}^{K-1} \sum_{i=0}^{L-1} c_{l,i,k} (a_{l,i} b_{l,k}^H) \\ \sum_{k=0}^{K-1} \sum_{i=0}^{L-1} c_{l,i+L,k} (a_{l,i} b_{l,k}^H) \end{bmatrix},$$

l is a layer index with a range of l=1, ..., v, v is an associated rank indicator (RI) value, and $A_l$, $B_l$, and $C_l$ are indicated by the PMI for each l=1, ..., v, and wherein:
- $A_l = [a_{l,0} \ a_{l,1} \ \ldots \ a_{l,L-1}]$, $a_{l,i}$ is a $N_1 N_2 \times 1$ column vector for spatial domain (SD) antenna ports, where $N_1$ and $N_2$ are number of antenna ports, respectively, with a same antenna polarization in a first and a second dimensions of a two-dimensional dual-polarized channel state information-reference signal (CSI-RS) antenna ports at the BS;
- $B_l = [b_{l,0} \ b_{l,1} \ \ldots \ b_{l,K-1}]$, $b_{l,k}$ is a $N_3 \times 1$ column vector for FD units;
- $C_l$ is a $2L \times K$ matrix comprising complex coefficients $c_{l,i,k} = p_{l,i,k}^{(1)} p_{l,i,k}^{(2)} \phi_{l,i,k}$, where $p_{l,i,k}^{(1)}$ is a first amplitude coefficient, $p_{l,i,k}^{(2)}$ is a second amplitude coefficient, and $\phi_{l,i,k}$ is a phase coefficient;
- a number (L) of column vectors for SD antenna ports is configured from a set that includes $\{2, 4\}$; and
- a number (K) of column vectors for FD units is determined as $K = \lfloor p \times N_3 / R \rfloor$, where p is configured from a set that includes $$\left\{\frac{1}{2}, \frac{1}{4}\right\}.$$

7. A base station (BS) for a channel state information (CSI) feedback in a wireless communication system, the BS comprising:
a transceiver configured to:
  transmit, to a user equipment (UE), CSI feedback configuration information including a number ($N_{SB}$) of subbands (SB) and a number (R) of frequency domain (FD) units per SB, wherein $N_{SB}$ and R determine a total number ($N_3$) of FD units for precoding matrices and wherein R corresponds to a number of precoding matrices per SB; and
  receive, from the UE, the CSI feedback over an uplink channel; and
a processor operably connected to the transceiver, the processor configured to determine the CSI feedback that is derived based on the CSI feedback configuration information transmitted to the UE, the CSI feedback including a precoding matrix indicator (PMI) indicating a precoding matrix for each FD unit of the total number ($N_3$) of FD units, which includes R number of precoding matrices for each of the $N_{SB}$ SBs.

8. The BS of claim 7, wherein $N_3 = N_{SB} \times R$.

9. The BS of claim 7, wherein the PMI includes an indicator indicating an index of a strongest coefficient per layer of the CSI feedback.

10. The BS of claim 7, wherein R is configured from $\{1, 2\}$.

11. The BS of claim 7, wherein:
R is configured from multiple candidate values when the UE reports, via UE capability signaling, capability information indicating that the UE supports multiple R values; or
R is set to a default value 1.

12. The BS of claim 7, wherein:
the $N_3$ precoding matrices for the total number ($N_3$) of FD units are determined by columns of $$W = \frac{1}{\sqrt{v}}[W^1 \ W^2 \ \ldots \ W^v], \text{ where}$$

$$W^l = \begin{bmatrix} A_l & 0 \\ 0 & A_l \end{bmatrix} C_l B_l^H = \begin{bmatrix} \sum_{k=0}^{K-1} \sum_{i=0}^{L-1} c_{l,i,k} (a_{l,i} b_{l,k}^H) \\ \sum_{k=0}^{K-1} \sum_{i=0}^{L-1} c_{l,i+L,k} (a_{l,i} b_{l,k}^H) \end{bmatrix},$$

l is a layer index with a range of l=1, ..., v, v is an associated rank indicator (RI) value, and $A_l$, $B_l$, and $C_l$ are indicated by the PMI for each l=1, ..., v, and wherein:
- $A_l = [a_{l,0} \ a_{l,1} \ \ldots \ a_{l,L-1}]$, $a_{l,i}$ is a $N_1 N_2 \times 1$ column vector for spatial domain (SD) antenna ports, where $N_1$ and $N_2$ are number of antenna ports, respectively, with a same antenna polarization in a first and a second dimensions of a two-dimensional dual-polarized channel state information-reference signal (CSI-RS) antenna ports at the BS;
- $B_l = [b_{l,0} \ b_{l,1} \ \ldots \ b_{l,K-1}]$, $b_{l,k}$ is a $N_3 \times 1$ column vector for FD units;
- $C_l$ is a $2L \times K$ matrix comprising complex coefficients $c_{l,i,k} = p_{l,i,k}^{(1)} p_{l,i,k}^{(2)} \phi_{l,i,k}$, where $p_{l,i,k}^{(1)}$ is a first amplitude coefficient, $p_{l,i,k}^{(2)}$ is a second amplitude coefficient, and $\phi_{l,i,k}$ is a phase coefficient;
- a number (L) of column vectors for SD antenna ports is configured from a set that includes $\{2, 4\}$; and
- a number (K) of column vectors for FD units is determined as $K = \lfloor p \times N_3 / R \rfloor$, where p is configured from a set that includes $$\left\{\frac{1}{2}, \frac{1}{4}\right\}.$$

13. A method of a user equipment (UE) for a channel state information (CSI) feedback in a wireless communication system, the method comprising:
receiving, from a base station (BS), CSI feedback configuration information including a number ($N_{SB}$) of subbands (SB) and a number (R) of frequency domain (FD) units per SB, wherein $N_{SB}$ and R determine a total number ($N_3$) of FD units for precoding matrices and wherein R corresponds to a number of precoding matrices per SB;
deriving CSI feedback based on the CSI feedback configuration information, wherein the CSI feedback includes a precoding matrix indicator (PMI) indicating a precoding matrix for each FD unit of the total number ($N_3$) of FD units, which includes R number of precoding matrices for each of the $N_{SB}$ SBs; and
transmitting the CSI feedback over an uplink channel.

14. The method of claim 13, wherein $N_3 = N_{SB} \times R$.

15. The method of claim 13, wherein the PMI includes an indicator indicating an index of a strongest coefficient per layer of the CSI feedback.

16. The method of claim 13, wherein R is configured from $\{1, 2\}$.

17. The method of claim 13, wherein:
R is configured from multiple candidate values when the UE reports, via UE capability signaling, capability information indicating that the UE supports multiple R values; or
R is set to a default value 1.

18. The method of claim 13, wherein:
the $N_3$ precoding matrices for the total number ($N_3$) of FD units are determined by columns of $$W = \frac{1}{\sqrt{v}} [W^1 \; W^2 \; \ldots \; W^v], \text{ where}$$

$$W^l = \begin{bmatrix} A_l & 0 \\ 0 & A_l \end{bmatrix} C_l B_l^H = \begin{bmatrix} \sum_{k=0}^{K-1} \sum_{i=0}^{L-1} c_{l,i,k} (a_{l,i} b_{l,k}^H) \\ \sum_{k=0}^{K-1} \sum_{i=0}^{L-1} c_{l,i+L,k} (a_{l,i} b_{l,k}^H) \end{bmatrix},$$

l is a layer index with a range of l=1, ..., v, v is an associated rank indicator (RI) value, and $A_l$, $B_l$, and $C_l$ are indicated by the PMI for each l=1, ..., v, and wherein;

$A_l = [a_{l,0} \; a_{l,1} \; \ldots \; a_{l,L-1}]$, $a_{l,i}$ is a $N_1 N_2 \times 1$ column vector for spatial domain (SD) antenna ports, where $N_1$ and $N_2$ are number of antenna ports, respectively, with a same antenna polarization in a first and a second dimensions of a two-dimensional dual-polarized channel state information-reference signal (CSI-RS) antenna ports at the BS;

$B_l = [b_{l,0} \; b_{l,1} \; \ldots \; b_{l,K-1}]$, $b_{l,k}$ is a $N_3 \times 1$ column vector for FD units;

$C_l$ is a $2L \times K$ matrix comprising complex coefficients $c_{l,i,k} = p_{l,i,k}^{(1)} p_{l,i,k}^{(2)} \phi_{l,i,k}$, where $p_{l,i,k}^{(1)}$ is a first amplitude coefficient, $p_{l,i,k}^{(2)}$ is a second amplitude coefficient, and $\phi_{l,i,k}$ is a phase coefficient;

a number (L) of column vectors for SD antenna ports is configured from a set that includes $\{2, 4\}$; and a number (K) of column vectors for FD units is determined as $K = \lfloor p \times N_3 / R \rfloor$, where p is configured from a set that includes $$\left\{ \frac{1}{2}, \frac{1}{4} \right\},$$

and
wherein $A_1 = A_2 = \ldots = A_v$ implies that a set of L column vectors for SD antenna ports that are common for all v layers is reported via PMI.

19. The UE of claim 6, wherein, for each l=1, ..., v:
the PMI includes amplitude coefficient indicators $i_{1,4,l}$ and $i_{2,2,l}$ and phase coefficient indicator $i_{2,1,l}$ that indicate first amplitude coefficients $p_{l,i,k}^{(1)}$, second amplitude coefficients $p_{l,i,k}^{(2)}$, and phase coefficients $\phi_{l,i,k}$, respectively;

the amplitude coefficient indicator $i_{2,2,l}$ comprising 2LK elements is given by: $i_{2,2,l} = [k_{l,0,0}^{(2)}, k_{l,1,0}^{(2)}, \ldots, k_{l,2L-1,0}^{(2)} \; k_{l,0,1}^{(2)}, k_{l,1,1}^{(2)}, \ldots, k_{l,2L-1,1}^{(2)} \ldots k_{l,0,K-1}^{(2)}, k_{l,1,K-1}^{(2)}, \ldots, k_{l,2L-1,K-1}^{(2)}]$ and the phase coefficient indicator $i_{2,1,l}$ comprising 2LK elements is given by: $i_{2,1,l} = [d_{l,0,0}, d_{l,1,0}, \ldots, d_{l,2L-1,0} \; d_{l,0,1}, d_{l,1,1}, \ldots, d_{l,2L-1,1} \ldots d_{l,0,K-1}, d_{l,1,K-1}, \ldots, d_{l,2L-1,K-1}]$.

20. The BS of claim 12, wherein, for each l=1, ..., v:
the PMI includes amplitude coefficient indicators $i_{1,4,l}$ and $i_{2,2,l}$ and phase coefficient indicator $i_{2,1,l}$ that indicate first amplitude coefficients $p_{l,i,k}^{(1)}$, second amplitude coefficients $p_{l,i,k}^{(2)}$, and phase coefficients $\phi_{l,i,k}$, respectively;

the amplitude coefficient indicator $i_{2,2,l}$ comprising 2LK elements is given by: $i_{2,2,l} = [k_{l,0,0}^{(2)}, k_{l,1,0}^{(2)}, \ldots, k_{l,2L-1,0}^{(2)} \; k_{l,0,1}^{(2)}, k_{l,1,1}^{(2)}, \ldots, k_{l,2L-1,1}^{(2)} \ldots k_{l,0,K-1}^{(2)}, k_{l,1,K-1}^{(2)}, \ldots, k_{l,2L-1,K-1}^{(2)}]$ and the phase coefficient indicator $i_{2,1,l}$ comprising 2LK elements is given by: $i_{2,1,l} = [d_{l,0,0}, d_{l,1,0}, \ldots, d_{l,2L-1,0} \; d_{l,0,1}, d_{l,1,1}, \ldots, d_{l,2L-1,1} \ldots d_{l,0,K-1}, d_{l,1,K-1}, \ldots, d_{l,2L-1,K-1}]$.

21. The UE of claim 6, wherein, for each l=1, ..., v:
the PMI includes a strongest coefficient indicator $i_{1,3,l}$ that takes a value from $\{0,1, \ldots, 2L-1\}$ and indicates the strongest coefficient out of the 2LK coefficients in the matrix $C_l$.

22. The UE of claim 6, wherein, for each l=1, ..., v:
the PMI includes an indicator that indicates K column vectors $[b_{l,0} b_{l,1} \ldots b_{l,K-1}]$ for FD units jointly from a set of DFT vectors.

$$w_k = \begin{bmatrix} 1 & e^{j\frac{2\pi k}{N_3}} & \ldots & e^{j\frac{2\pi(N_3-1)}{N_3}} \end{bmatrix}, \text{ where } k = 0, 1, \ldots, N_3 - 1.$$

23. The BS of claim 12, wherein, for each l=1, ..., v:
the PMI includes a strongest coefficient indicator $i_{1,3,l}$ that takes a value from $\{0,1, \ldots, 2L-1\}$ and indicates the strongest coefficient out of the 2LK coefficients in the matrix $C_l$.

24. The BS of claim 12, wherein, for each l=1, ..., v:
the PMI includes an indicator that indicates K column vectors $[b_{1,0} b_{l,1} \ldots b_{l,K-1}]$ for FD units jointly from a set of DFT vectors.

$$w_k = \begin{bmatrix} 1 & e^{j\frac{2\pi k}{N_3}} & \ldots & e^{j\frac{2\pi(N_3-1)}{N_3}} \end{bmatrix}, \text{ where } k = 0, 1, \ldots, N_3 - 1.$$

* * * * *